United States Patent
Yagi et al.

(10) Patent No.: US 9,068,290 B2
(45) Date of Patent: Jun. 30, 2015

(54) COLORING COMPOSITION FOR INKJET TEXTILE PRINTING, TEXTILE PRINTING METHOD, AND FABRIC

(71) Applicant: FUJIFILM CORPORATION, Minato-ku, Tokyo (JP)

(72) Inventors: Kazunari Yagi, Kanagawa (JP); Yasuhiro Ishiwata, Kanagawa (JP); Yutaro Norizuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/517,926

(22) Filed: Oct. 20, 2014

(65) Prior Publication Data
US 2015/0037546 A1 Feb. 5, 2015

Related U.S. Application Data

(63) Continuation of application No. PCT/JP2013/059347, filed on Mar. 28, 2013.

(30) Foreign Application Priority Data

Apr. 27, 2012 (JP) ................................ 2012-102817

(51) Int. Cl.

| | |
|---|---|
| *D06P 3/24* | (2006.01) |
| *B41J 2/01* | (2006.01) |
| *B41M 5/00* | (2006.01) |
| *C09D 11/00* | (2014.01) |
| *C09D 11/328* | (2014.01) |
| *D06P 1/08* | (2006.01) |
| *D06P 5/30* | (2006.01) |
| *D06P 3/26* | (2006.01) |
| *C09B 29/036* | (2006.01) |
| *C09B 29/08* | (2006.01) |
| *C09B 43/11* | (2006.01) |
| *D06P 1/18* | (2006.01) |

(52) U.S. Cl.
CPC ... *D06P 3/24* (2013.01); *B41J 2/01* (2013.01); *B41M 5/00* (2013.01); *C09D 11/00* (2013.01); *D06P 1/18* (2013.01); *C09D 11/328* (2013.01); *D06P 1/08* (2013.01); *D06P 5/30* (2013.01); *D06P 3/26* (2013.01); *C09B 29/0051* (2013.01); *C09B 29/0801* (2013.01); *C09B 29/0809* (2013.01); *C09B 43/11* (2013.01)

(58) Field of Classification Search
CPC ................ D06P 3/24; D06P 1/08; D06P 5/30
USPC ............................................................. 8/684
See application file for complete search history.

(56) References Cited

U.S. PATENT DOCUMENTS

| | | | |
|---|---|---|---|
| 6,489,452 B1 * | 12/2002 | Tateishi et al. ................. | 534/775 |
| 2008/0032098 A1 * | 2/2008 | Hornby et al. ............. | 428/195.1 |
| 2008/0081279 A1 * | 4/2008 | Fujie et al. .................... | 430/235 |

FOREIGN PATENT DOCUMENTS

| | | |
|---|---|---|
| JP | S51-095431 A | 8/1976 |
| JP | S61-036362 A | 2/1986 |
| JP | 2000-169777 A | 6/2000 |
| JP | 2001-335714 A | 12/2001 |
| JP | 2011-179130 A | 9/2011 |

OTHER PUBLICATIONS

STIC Search Report dated Dec. 16, 2014.*

* cited by examiner

*Primary Examiner* — Eisa Elhilo
(74) *Attorney, Agent, or Firm* — Solaris Intellectual Property Group, PLLC

(57) ABSTRACT

A coloring composition for inkjet textile printing, containing water and a dye represented by Formula (I) [$R^1$ represents H, halogen, alkyl, aralkyl, aryl, heteroaryl, alkoxy, or cyano; $R^2$ represents H, halogen, cyano, —$COOR^6$, —$COR^7$, —$CONR^8R^9$, or an ionic hydrophilic group; $R^3$ represents alkyl, aralkyl, alkenyl, alkynyl, aryl, or heteroaryl; each of $R^4$ and $R^5$ independently represents H, alkyl, cycloalkyl, aralkyl, alkenyl, alkynyl, aryl, or heteroaryl; $R^{15}$ represents H or a substituent; X represents alkyl, cycloalkyl, aralkyl, aryl, heteroaryl, —$COR^{12}$, or —$CONR^{13}R^{14}$; $R^6$ represents alkyl, aryl, or heteroaryl; each of $R^7$ to $R^{14}$ independently represents H, alkyl, aryl, or heteroaryl; and a number of ionic hydrophilic groups in one molecule is from 1 to 5].

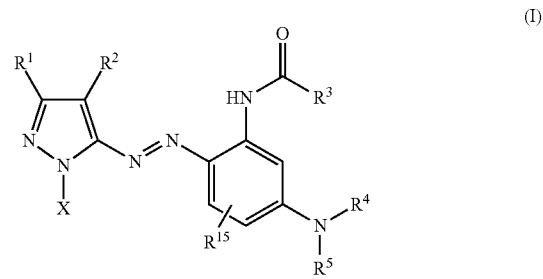

9 Claims, No Drawings

US 9,068,290 B2

COLORING COMPOSITION FOR INKJET TEXTILE PRINTING, TEXTILE PRINTING METHOD, AND FABRIC

CROSS-REFERENCE TO RELATED APPLICATIONS

This application is a continuation application of International Application No. PCT/JP2013/059347, filed Mar. 28, 2013, which is incorporated herein by reference. Further, this application claims priority from Japanese Patent Application No. 2012-102817, filed Apr. 27, 2012, which is incorporated herein by reference.

TECHNICAL FIELD

The present invention relates to a coloring composition for inkjet textile printing, a textile printing method, and a fabric.

BACKGROUND ART

Conventionally, as a method of textile printing on a fabric or the like, screen textile printing, which uses screen printing techniques or the like has been employed.

In recent years, apart from screen textile printing, inkjet textile printing, which uses techniques of an inkjet method, have also been employed.

Unlike conventional screen textile printing, inkjet textile printing has an advantage in that there is no need of plate-making and an advantage in that it is possible to quickly form an image with excellent gradation properties. Furthermore, since only the amount of ink required for image formation is used, inkjet printing also has an environmental advantage in that waste liquid is less and the like, compared to conventional methods such as a screen textile printing method.

A xanthene dye or an H-acid azo dye can be used as a dye in the inkjet textile printing.

For example, as an inkjet textile printing method in which ink bleeding is low, a method in which inkjet textile printing is performed by using an ink containing an acidic dye such as Acid Red 289 having a xanthene skeleton is known (for example, refer to Japanese Patent Application Laid-Open (JP-A) No. 2011-179130).

As a dye used in conventional textile printing methods (not inkjet textile printing), various dyes are conventionally known.

For example, a method of textile printing a pyrazolyl azo aniline dye having a specific structure on a polyamide fiber or a polyester fiber is known (for example, refer to Japanese Patent Application Laid-Open (JP-A) No. S61-36362 and JP-A No. S51-95431).

In addition, a method of forming an image on a recording paper by an inkjet method using an ink including a pyrazolyl azo aniline dye having a specific structure is known (for example, refer to JP-A No. 2001-335714 and JP-A No. 2000-169777).

SUMMARY OF INVENTION

Problem to be Solved

Since in inkjet textile printing forms an image on a fabric, the formed image is required to have wet fastness, in particular, resistance against perspiration (hereinafter, also referred to as "perspiration resistance"). The perspiration resistance described here, for example, refers to a property evaluated by "Test method for color fastness to perspiration (JIS L 0848 (2004), which substantially corresponds to ISO 105-E04 1994)".

However, in the case of performing inkjet textile printing using a conventional coloring composition containing a dye (a xanthene dye, an H-acid azo dye, or the like) and water by, for example, the inkjet textile printing method described in JP-A No. 2011-179130, perspiration resistance of the formed image is low in some cases.

Since the techniques described in JP-A No. 2001-335714 and JP-A No. 2000-169777 are techniques for forming an image on a recording paper, attention is not paid to perspiration resistance of an image in inkjet textile printing at all.

In addition, since a coloring composition (ink) is jetted from inkjet nozzles in inkjet textile printing, stability in being jetted from inkjet nozzles is required.

However, in the case of applying a pyrazolyl azo aniline dye having a specific structure described in JP-A No. S61-36362 and JP-A No. 551-95431 in inkjet textile printing, it was found that stability in being jetted from inkjet nozzles is low in some cases.

The invention has been made in view of the above circumstances.

The invention provides a coloring composition for inkjet textile printing capable of forming an image with excellent stability in being jetted from inkjet nozzles and excellent perspiration resistance (resistance with respect to perspiration) by the inkjet textile printing.

In addition, the invention provides a textile printing method capable of stably forming an image with excellent perspiration resistance (resistance with respect to perspiration) by the inkjet textile printing using the coloring composition for inkjet textile printing.

In addition, the invention provides a fabric provided with an image with excellent perspiration resistance (resistance with respect to perspiration) by the textile printing method.

Solution to Problem

The invention provides the following.

<1> A coloring composition for inkjet textile printing, comprising:
water and a dye represented by the following Formula (I):

$$(I)$$

wherein, in Formula (I), $R^1$ represents a hydrogen atom, a halogen atom, an alkyl group, an aralkyl group, an aryl group, a heteroaryl group, an alkoxy group, or a cyano group;

$R^2$ represents a hydrogen atom, a halogen atom, a cyano group, a —$COOR^6$ group, a —$COR^7$ group, a —$CONR^8R^9$ group, a —$SONR^{10}R^{11}$ group, or an ionic hydrophilic group;

$R^3$ represents an alkyl group, an aralkyl group, an alkenyl group, an alkynyl group, an aryl group, or a heteroaryl group;

each of $R^4$ and $R^5$ independently represents a hydrogen atom, an alkyl group, a cycloalkyl group, an aralkyl group, an alkenyl group, an alkynyl group, an aryl group, or a heteroaryl group, and $R^4$ and $R^5$ may be bonded to each other to form a heterocycle with the nitrogen atom to which $R^4$ and $R^5$ are bonded;

$R^{15}$ represents a hydrogen atom or a substituent;

X represents an alkyl group, a cycloalkyl group, an aralkyl group, an aryl group, a heteroaryl group, a —$COR^{12}$ group, or a —$CONR^{13}R^{14}$ group;

$R^6$ represents an alkyl group, an aryl group, or a heteroaryl group;

each of $R^7$ to $R^{14}$ independently represents a hydrogen atom, an alkyl group, an aryl group, or a heteroaryl group; and a total number of ionic hydrophilic groups included, as a substituent, in one molecule of the dye represented by Formula (I) is from 1 to 5.

<2> The coloring composition according to <1>, wherein X is a group represented by the following Formula (X-1):

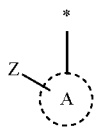

(X-1)

wherein, in Formula (X-1), A represents a cycloalkyl group, an aryl group, or a heteroaryl group, and "*" represents a binding site with the pyrazole ring in Formula (I);

Z represents a monovalent substituent that is bonded to at least one of two atoms in A that are respectively adjacent to an atom bonded to the pyrazole ring in Formula (I), the monovalent substituent represented by Z is a substituent (a) selected from the group consisting of a halogen atom, an alkyl group, a cycloalkyl group, an alkenyl group, an aralkyl group, an aryl group, a heteroaryl group, a cyano group, a hydroxyl group, a nitro group, an amino group, an alkyl amino group, an alkoxy group, an aryloxy group, an aryl amino group, a sulfamoyl amino group, an alkyl thio group, an aryl thio group, an alkoxycarbonyl amino group, a carbamoyl group, a sulfamoyl group, an alkoxycarbonyl group, a heterocyclic oxy group, an acyloxy group, a carbamoyloxy group, a silyloxy group, an aryloxy carbonyl group, an aryloxy carbonyl amino group, a heterocyclic thio group, an acyl group and an ionic hydrophilic group, or a substituent (b) obtainable by bonding the substituent (a) and a linking group selected from the group consisting of an amide group, a ureido group, a sulfonamide group, a sulfonyl group, an azo group, an imide group, a sulfinyl group and a phosphoryl group; and in a case in which two Z's are present in Formula (X-1), the two Z's may be the same as or different from each other.

<3> The coloring composition according to <1> or <2>, wherein X is a group represented by the following Formula (X-2):

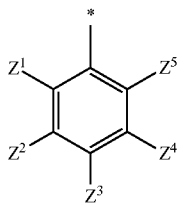

(X-2)

wherein, in Formula (X-2), "*" represents a binding site with the pyrazole ring in Formula (I);

each of $Z^1$, $Z^2$, $Z^3$, $Z^4$ and $Z^5$ independently represents a hydrogen atom, a halogen atom, a cyano group, a nitro group, an amino group, an alkyl amino group, an aryl amino group, an ionic hydrophilic group, an alkyl carbonyl amino group, an aryl carbonyl amino group, an alkyl sulfonyl amino group, an aryl sulfonyl amino group, or an aryl carbonyl amino group substituted with an ionic hydrophilic group, but $Z^1$ and $Z^5$ do not simultaneously represent a hydrogen atom.

<4> The coloring composition according to any one of <1> to <3>, wherein:

$R^1$ represents a hydrogen atom, a halogen atom, an alkyl group, or a cyano group, $R^2$ represents a hydrogen atom, a halogen atom, a cyano group, a —$COOR^6$ group, a —$CONR^8R^9$ group, or an ionic hydrophilic group, $R^3$ represents an alkyl group, an aryl group, or an aryl group substituted with an ionic hydrophilic group, each of $R^4$ and $R^5$ independently represents a hydrogen atom, an alkyl group, an aralkyl group, an aryl group, a heteroaryl group, an alkyl group substituted with an ionic hydrophilic group, an aralkyl group substituted with an ionic hydrophilic group, an aryl group substituted with an ionic hydrophilic group, or a heteroaryl group substituted with an ionic hydrophilic group, but $R^4$ and $R^5$ do not simultaneously represent a hydrogen atom, and $R^{15}$ represents a hydrogen atom, a halogen atom, an alkyl group, or an alkoxy group.

<5> The coloring composition according to any one of <1> to <4>, wherein each ionic hydrophilic group included in one molecule of the dye as a substituent is selected from the group consisting of a carboxy group, a salt of a carboxy group, a sulfo group, a salt of a sulfo group and a quaternary ammonium group.

<6> The coloring composition according to <3>, wherein each of $Z^1$, $Z^2$, $Z^3$, $Z^4$, and $Z^5$ independently represents a hydrogen atom, a halogen atom, a cyano group, an aryl carbonyl amino group, or an aryl carbonyl amino group substituted with an ionic hydrophilic group selected from the group consisting of a carboxy group, a salt of a carboxy group, a sulfo group and a salt of a sulfo group.

<7> The coloring composition according to <6>, wherein:

$R^1$ represents a hydrogen atom, a halogen atom, an alkyl group, or a cyano group;

$R^2$ represents a hydrogen atom, a halogen atom, a cyano group, a —$COOR^6$ group, a —$CONR^8R^9$ group, or an ionic hydrophilic group;

$R^3$ represents an alkyl group, an aryl group, or an aryl group substituted with an ionic hydrophilic group;

each of $R^4$ and $R^5$ independently represents a hydrogen atom, an alkyl group, an aralkyl group, an aryl group, a heteroaryl group, an alkyl group substituted with an ionic hydrophilic group, an aralkyl group substituted with an ionic hydrophilic group, an aryl group substituted with an ionic hydrophilic group, or a heteroaryl group substituted with an ionic hydrophilic group, but $R^4$ and $R^5$ do not simultaneously represent a hydrogen atom; and $R^{15}$ represents a hydrogen atom, a halogen atom, an alkyl group, or an alkoxy group.

<8> The coloring composition according to <6> or <7>, wherein each ionic hydrophilic group included in one molecule of the dye as a substituent is selected from the group consisting of a carboxy group, a salt of a carboxy group, a sulfo group, a salt of a sulfo group and a quaternary ammonium group.

<9> The coloring composition according to any one of <1> to <8>, wherein:

$R^1$ represents an alkyl group;

$R^2$ represents a halogen atom or a cyano group;

$R^3$ represents an alkyl group or an aryl group;

each of $R^4$ and $R^5$ independently represents an alkyl group or an alkyl group substituted with an ionic hydrophilic group selected from the group consisting of a carboxy group, a salt of a carboxy group, a sulfo group and a salt of a sulfo group; and $R^{15}$ represents a hydrogen atom.

<10> A textile printing method, comprising applying the coloring composition according to any one of <1> to <9> onto a fabric comprising a polyamide fiber by an inkjet method.

<11> A fabric having an image formed thereon by the textile printing method according to <10>.

Effects of Invention

It is possible to provide a coloring composition for inkjet textile printing capable of forming an image with excellent stability in being jetted from inkjet nozzles and excellent perspiration resistance (resistance with respect to perspiration) by the inkjet textile printing.

In addition, it is possible to provide a textile printing method capable of stably forming an image with excellent perspiration resistance (resistance with respect to perspiration) by the inkjet textile printing using the coloring composition for inkjet textile printing.

In addition, it is possible to provide a fabric provided with an image with excellent perspiration resistance (resistance with respect to perspiration) by the printing textile method.

DESCRIPTION OF EMBODIMENTS

In the present specification, in the case of mentioning of the amount of a certain component in a composition, in a case in which plural substances corresponding to the component are present in the composition, the amount means the total amount of the plural substances present in the composition, unless particularly otherwise defined.

Not only a step which is independent, but also a step which is unable to be clearly distinguished from other steps is included in the term "step", as long as it is a step which accomplishes the action desired therein.

The notation of the numeric value ranges in the specification signifies a range that includes the numeric value represented as the lower limit value of the numeric value range as the minimum value, and that includes the numeric value represented as the upper limit value of the numeric value range as the maximum value.

<<Coloring Composition for Inkjet Textile Printing>>

The coloring composition for inkjet textile printing, that is one embodiment of the invention (hereinafter, also referred to as a "coloring composition" or an "ink"), contains the dye represented by the following Formula (I) and water.

Since the coloring composition of the invention includes the dye represented by Formula (I), when an image is formed by inkjet textile printing, perspiration resistance (resistance with respect to perspiration) of the image may be improved.

The reason why such an effect can be obtained is not entirely clear, however, it is assumed to be as follows.

That is, since the dye represented by Formula (I) has a pyrazolyl azo aniline skeleton, the dye is likely to be polarized. It is assumed that by both the action of polarization of the dye and an electrostatic interaction between an ionic hydrophilic group and an ammonium group of the polyamide polymer chain terminals due to the possession of the ionic hydrophilic group in the dye, an interaction between the dye and the polyamide fibers becomes very strong, and as a result, perspiration resistance of a formed image is improved.

Furthermore, since the coloring composition of the invention includes the dye represented by Formula (I), stability in being jetted from inkjet nozzles is excellent. The reason for this is not clear, however, it is considered that the dye represented by Formula (I) includes an ionic hydrophilic group, and through the ionic hydrophilic group, solubility of the dye with respect to water is extremely high.

One of the advantages of inkjet textile printing is that it can form a gradation image or an image with a complex and/or fine color-patterned design, that is a weak point in screen textile printing in the conventional art. In the inkjet textile printing, in general, suppression of bleeding (for example, bleeding of an image in a step after the image formation (steam treatment step, washing with water, or the like; hereinafter, referred to as "post-step") or bleeding of an image at the time of cleaning of a printed fabric) of an image (in particular, a fine image) is required.

Regarding this bleeding, since the coloring composition of the invention includes the dye represented by Formula (I), when an image is formed by inkjet textile printing, bleeding (such as bleeding at the time of a post-step or cleaning) of the image may be suppressed.

It is assumed that the reason why such an effect can be obtained is similar to the reason why an effect of perspiration resistance can be obtained.

Furthermore, since the coloring composition of the invention includes the dye represented by the following Formula (I) having a pyrazolyl azo aniline skeleton, light fastness is also excellent.

Furthermore, according to the coloring composition of the invention, by including the dye represented by Formula (I), it is possible to form an image with a favorable hue of from red to magenta (including purplish magenta) on a fabric by inkjet textile printing.

Hereinafter, the dye represented by Formula (I) will be described, and other components included in the coloring composition of the invention will be described.

<Dye Represented by Formula (I)>

The coloring composition of the invention (ink) contains at least one kind of the dye represented by the following Formula (I).

The dye represented by Formula (I) is a compound having a pyrazolyl azo aniline skeleton.

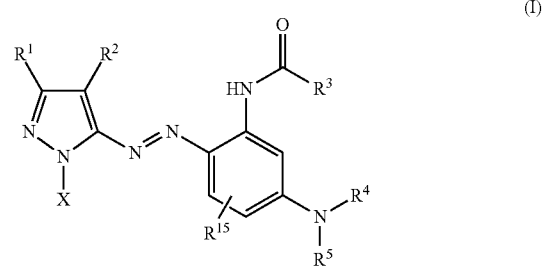

In Formula (I), $R^1$ represents a hydrogen atom, a halogen atom, an alkyl group, an aralkyl group, an aryl group, a heteroaryl group, an alkoxy group, or a cyano group $R^2$ represents a hydrogen atom, a halogen atom, a cyano group, a —$COOR^6$ group, a —$COR^7$ group, a —$CONR^8R^9$ group, a —$SONR^{10}R^{11}$ group, or an ionic hydrophilic group.

$R^3$ represents an alkyl group, an aralkyl group, an alkenyl group, an alkynyl group, an aryl group, or a heteroaryl group.

Each of $R^4$ and $R^5$ independently represents a hydrogen atom, an alkyl group, a cycloalkyl group, an aralkyl group, an alkenyl group, an alkynyl group, an aryl group, or a heteroaryl group. $R^4$ and $R^5$ may be bonded to each other to form a heterocycle with the nitrogen atom to which $R^4$ and $R^5$ are bonded.

$R^{15}$ represents a hydrogen atom or a substituent.

X represents an alkyl group, a cycloalkyl group, an aralkyl group, an aryl group, a heteroaryl group, a —$COR^{12}$ group, or a —$CONR^{13}R^{14}$ group.

$R^6$ represents an alkyl group, an aryl group, or a heteroaryl group, and each of $R^7$ to $R^{14}$ independently represents a hydrogen atom, an alkyl group, an aryl group, or a heteroaryl group.

A total number of ionic hydrophilic groups included, as a substituent, in one molecule of the dye represented by Formula (I) is from 1 to 5.

In Formula (I), in a case in which $R^1$ to $R^{14}$ and X are groups which can have a substituent (for example, in a case in which each of $R^1$ to $R^{14}$ and X is an alkyl group, a cycloalkyl group, an aralkyl group, an aryl group, a heteroaryl group, an alkoxy group, a —$COOR^6$ group, a —$COR^7$ group, a —$CONR^8R^9$ group, a —$SONR^{10}R^{11}$ group, a —$COR^{12}$ group, or a —$CONR^{13}R^{14}$ group), these groups may be further substituted with a substituent.

Examples of the substituent include: a monovalent substituent selected from the group consisting of a halogen atom, an alkyl group, a cycloalkyl group, an alkenyl group, an alkynyl group, an aralkyl group, an aryl group, a heteroaryl group, a cyano group, a hydroxyl group, a nitro group, an amino group, an alkyl amino group, an alkoxy group, an aryloxy group, an aryl amino group, a sulfamoyl amino group, an alkyl thio group, an aryl thio group, an alkoxycarbonyl amino group, a carbamoyl group, a sulfamoyl group, an alkoxycarbonyl group, a heterocyclic oxy group, an acyloxy group, a carbamoyloxy group, a silyloxy group, an aryloxy carbonyl group, an aryloxy carbonyl amino group, a heterocyclic thio group, an acyl group, and an ionic hydrophilic group; and a monovalent substituent obtainable by bonding of a monovalent substituent selected from the above-described group and a linking group selected from the group consisting of an amide group, a ureido group, a sulfonamide group, a sulfonyl group, an azo group, an imide group, a sulfinyl group, and a phosphoryl group. These monovalent substituents may be further substituted with an ionic hydrophilic group.

Examples of the monovalent substituent obtainable by bonding of a monovalent substituent selected from the above-described group and a linking group selected from the group consisting of an amide group, a ureido group, a sulfonamide group, a sulfonyl group, an azo group, an imide group, a sulfinyl group, and a phosphoryl group include an alkyl carbonyl amino group, an aryl carbonyl amino group, an alkyl sulfonyl amino group, and an aryl sulfonyl amino group.

The total number of ionic hydrophilic groups included, as a substituent, in one molecule of the dye represented by Formula (I) is from 1 to 5.

Examples of the ionic hydrophilic group included in the dye represented by Formula (I) include a carboxy group, a salt of a carboxy group, a sulfo group, a salt of a sulfo group, and a quaternary ammonium group.

Examples of a counter ion that forms a salt in a salt of a carboxy group and a salt of a sulfo group include an alkali metal ion (for example, a sodium ion, a potassium ion, and a lithium ion) and an organic cation (for example, tetramethylguanidium ion and tetraethylammonium ion).

As the ionic hydrophilic group, a carboxy group, a salt of a carboxy group, a sulfo group, or a salt of a sulfo group is preferable, and a sulfo group or a salt of the sulfo group is more preferable.

In a case in which two or more ionic hydrophilic groups are included in the dye represented by Formula (I), the two or more ionic hydrophilic groups may be the same as or different from each other.

In Formula (I), a part in which an ionic hydrophilic group is included is not particularly limited, and it may be at least one selected from the group consisting of $R^1$ to $R^5$ and X. That is, one to five ionic hydrophilic groups in total may be included in $R^1$ to $R^5$ and X.

In the dye represented by Formula (I), the total number of ionic hydrophilic groups included in one molecule as a substituent is preferably from 1 to 3.

In addition, in Formula (I), the part in which an ionic hydrophilic group is included is preferably at least one of X, $R^4$, or $R^5$.

In Formula (I), examples of a halogen atom include a fluorine atom, a chlorine atom, and a bromine atom. A fluorine atom and a chlorine atom are preferable, and a chlorine atom is particularly preferable.

In Formula (I), the alkyl group may be a linear alkyl group or a branched alkyl group.

A total number of carbon atoms of the alkyl group is preferably from 1 to 12, more preferably from 1 to 8, and still more preferably from 1 to 6.

Examples of the alkyl group include a methyl group, an ethyl group, an n-propyl group, an i-propyl group, an n-butyl, an s-butyl group, a t-butyl group, a pentyl group, a hexyl group, an octyl group, a nonyl group, a decyl group, an undecyl group, and a dodecyl group.

In Formula (I), the cycloalkyl group may be a cycloalkyl group having a monocyclic structure or a cycloalkyl group having a condensed structure.

A total number of carbon atoms of the cycloalkyl group is preferably from 3 to 12, more preferably from 3 to 8, and particularly preferably from 6 to 8.

Examples of the cycloalkyl group include a cyclopropyl group, a cyclobutyl group, a cyclopentyl group, a cyclohexyl group, a cycloheptyl group, a cyclooctyl group, a cyclononyl group, a cyclodecyl group, a cycloundecyl group, and a cyclododecyl group.

In Formula (I), the alkenyl group may be a linear alkenyl group or a branched alkenyl group.

A total number of carbon atoms of the alkenyl group is preferably from 2 to 12, more preferably from 2 to 8, and particularly preferably from 2 to 6.

In Formula (I), the alkynyl group may be a linear alkynyl group or a branched alkynyl group.

A total number of carbon atoms of the alkynyl group is preferably from 2 to 12, more preferably from 2 to 8, and particularly preferably from 2 to 6.

In Formula (I), the aralkyl group may be a linear alkyl group substituted with an aryl group or a branched alkyl group substituted with an aryl group.

A total number of carbon atoms of the aralkyl group is preferably from 7 to 14.

Examples of the aralkyl group include a benzyl group and a 2-phenethyl group.

In Formula (I), the aryl group may be an aryl group having a monocyclic structure or an aryl group having a condensed structure.

The total number of carbon atoms of the aryl group is preferably from 6 to 12.

Examples of the aryl group include a phenyl group and a naphthyl group, and a phenyl group is particularly preferable.

In Formula (I), the heteroaryl group may be a heteroaryl group having a monocyclic structure or a heteroaryl group having a condensed structure.

The heteroaryl group is preferably a heteroaryl group having a 5- to 8-membered cyclic structure.

Examples of the heteroaryl group include a pyridyl group, a pyrimidinyl group, a pyrazinyl group, a pyridazinyl group, a triazinyl group, a thienyl group, a furyl group, a pyrazolyl group, an imidazolyl group, an oxazolyl group, a thiazolyl group, a benzoxazolyl group, a benzothiazolyl group, a quinolinyl group, and a benzimidazolyl group.

In Formula (I), the preferable range of an alkyl group included in a structure of an alkyl amino group, an alkoxy group, an alkylthio group, an alkoxycarbonyl amino group, or an alkoxycarbonyl group is the same as the preferable range of the alkyl group described above.

In Formula (I), the preferable range of an aryl group included in a structure of an aryloxy group, an aryl amino group, an aryl thio group, an aryloxy carbonyl group, or an aryloxy carbonyl amino group is the same as the preferable range of the aryl group described above.

In Formula (I), the preferable range of an alkyl group or an aryl group included in an acyl group or an acyloxy group is the same as the preferable range of the alkyl group or the aryl group described above.

In Formula (I), examples of the heterocyclic group included in a heterocyclic thio group include a heteroaryl group, a heterocycloalkyl group, a heterocycloalkenyl group, and a heterocycloalkynyl group, and a heteroaryl group is preferable. The preferable range of a heteroaryl group is as described above.

$R^1$ represents a hydrogen atom, a halogen atom, an alkyl group, an aralkyl group, an aryl group, a heteroaryl group, an alkoxy group, or a cyano group. Here, preferable embodiments of the halogen atom, the alkyl group, the aralkyl group, the aryl group, the heteroaryl group, or the alkoxy group is as described above, respectively.

As $R^1$, a hydrogen atom, a halogen atom, an alkyl group, or a cyano group is preferable, a hydrogen atom or an alkyl group is more preferable, an alkyl group is still more preferable, and an alkyl group having from 1 to 6 carbon atoms (more preferably 1 to 4 carbon atoms) is particularly preferable.

$R^2$ represents a hydrogen atom, a halogen atom, a cyano group, a —$COOR^6$ group, a —$COR^7$ group, a —$CONR^8R^9$ group, a —$SONR^{10}R^{11}$ group, or an ionic hydrophilic group. Here, preferable embodiments of the halogen atom and the ionic hydrophilic group are as described above, respectively.

$R^6$ represents an alkyl group, an aryl group, or a heteroaryl group, and each of $R^7$ to $R^{11}$ independently represents a hydrogen atom, an alkyl group, an aryl group, or a heteroaryl group. Here, preferable ranges of the alkyl group, the aryl group, and the heteroaryl group are as described above, respectively.

As $R^2$, a hydrogen atom, a halogen atom, a cyano group, a —$COOR^6$ group, a —$CONR^8R^9$ group, or an ionic hydrophilic group is preferable, and a halogen atom or a cyano group is more preferable.

$R^3$ represents an alkyl group, an aralkyl group, an alkenyl group, an alkynyl group, an aryl group, or a heteroaryl group. Here, preferable embodiments of the alkyl group, the aralkyl group, the alkenyl group, the alkynyl group, the aryl group, and the heteroaryl group is as described above, respectively.

As $R^3$, an alkyl group, an aryl group, or an aryl group substituted with an ionic hydrophilic group is preferable, an alkyl group or an aryl group is more preferable, and an alkyl group having from 1 to 6 carbon atoms (more preferably 1 to 4) or a phenyl group is particularly preferable.

Each of $R^4$ and $R^5$ independently represents a hydrogen atom, an alkyl group, a cycloalkyl group, an aralkyl group, an alkenyl group, an alkynyl group, an aryl group, or a heteroaryl group. $R^4$ and $R^5$ may be bonded to each other to form a heterocycle with the nitrogen atom to which $R^4$ and $R^5$ are bonded. Here, preferable embodiments of the alkyl group, the cycloalkyl group, the aralkyl group, the alkenyl group, the alkynyl group, the aryl group, and the heteroaryl group are as described above, respectively. In addition, in a case in which $R^4$ and $R^5$ are bonded to each other to form a heterocycle with the nitrogen atom to which $R^4$ and $R^5$ are bonded, a preferable embodiment of the heterocycle (heterocyclic group) formed is the same as the preferable embodiment of a heterocyclic group included in the heterocyclic thio group described above.

Preferably, each of $R^4$ and $R^5$ independently represents a hydrogen atom, an alkyl group, an aralkyl group, an aryl group, a heteroaryl group, an alkyl group substituted with an ionic hydrophilic group, an aralkyl group substituted with an ionic hydrophilic group, an aryl group substituted with an ionic hydrophilic group, or a heteroaryl group substituted with an ionic hydrophilic group (here, $R^4$ and $R^5$ do not simultaneously represent a hydrogen atom).

More preferably, each of $R^4$ and $R^5$ independently represents an alkyl group (preferably, an unsubstituted alkyl group having from 1 to 6 carbon atoms (more preferably, from 1 to 4 carbon atoms)) or an alkyl group (preferably, an alkyl group having from 1 to 6 carbon atoms (more preferably, from 1 to 4 carbon atoms)) substituted with an ionic hydrophilic group (preferably, an ionic hydrophilic group selected from the group consisting of a carboxy group, a salt of a carboxy group, a sulfo group, and a salt of a sulfo group).

A particularly preferable embodiment of $R^4$ and $R^5$ is an embodiment in which one of these represents an unsubstituted alkyl group (preferably, an unsubstituted alkyl group having from 1 to 6 carbon atoms (more preferably, from 1 to 4 carbon atoms)) and the other represents an alkyl group (preferably, an alkyl group having from 1 to 6 carbon atoms (more preferably, from 1 to 4 carbon atoms)) substituted with an ionic hydrophilic group (preferably, an ionic hydrophilic group selected from the group consisting of a carboxy group, a salt of a carboxy group, a sulfo group, and a salt of a sulfo group).

$R^{15}$ represents a hydrogen atom or a substituent.

In a case in which $R^{15}$ represents a substituent, the monovalent substituents exemplified above are preferable as a substituent, and among these, a halogen atom (preferably, a chlorine atom), an alkyl group (preferably, an alkyl group having from 1 to 4 carbon atoms), or an alkoxy group (preferably, an alkoxy group having from 1 to 4 carbon atoms) is preferable.

As $R^{15}$, a hydrogen atom, a halogen atom (preferably, a chlorine atom), an alkyl group (preferably, an alkyl group having from 1 to 4 carbon atoms), or an alkoxy group (preferably, an alkoxy group having from 1 to 4 carbon atoms) is more preferable, and a hydrogen atom is particularly preferable.

X represents an alkyl group, a cycloalkyl group, an aralkyl group, an aryl group, a heteroaryl group, a —$COR^{12}$ group, or a —$CONR^{13}R^{14}$ group. Here, preferable ranges of the alkyl group, the cycloalkyl group, the aralkyl group, the aryl group, or the heteroaryl group ares as described above, respectively.

Each of $R^{12}$ to $R^{14}$ independently represents a hydrogen atom, an alkyl group, an aryl group, or a heteroaryl group.

Here, a preferable range of an alkyl group, an aryl group, or a heteroaryl group is as described above, respectively.

As X, a cycloalkyl group, an aryl group, or a heteroaryl group is preferable, and a cycloalkyl group having a substituent, an aryl group having a substituent, or a heteroaryl group having a substituent is more preferable.

X is particularly preferably a group represented by the following Formula (X-1).

In a case in which X is a group represented by the following Formula (X-1), it is possible to obtain a more favorable hue (for example, a hue in a range in which a hue angle H° is from 340° to 360°, the same shall apply hereinafter) of a magenta color. The reason why the more favorable hue of a magenta color is obtained is not clear, however, it is assumed to be due to the position of Z in the group represented by Formula (X-1).

Magenta color is a hue in great demand in the field of textile printing, in particular. In addition, by using a coloring composition (ink) of a magenta color, it is possible to enlarge the range of color reproduction at the time of forming an image using inks of plural colors.

From the viewpoint described above, X is particularly preferably a group represented by the following Formula (X-1).

Furthermore, by using a group represented by the following Formula (X-1) as X, it is possible to further suppress bleeding of image and further improve perspiration resistance.

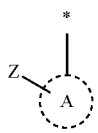

(X-1)

In Formula (X-1), A represents a cycloalkyl group, an aryl group, or a heteroaryl group, and "*" represents a binding site with the pyrazole ring in Formula (I).

Z represents a monovalent substituent that is bonded to at least one of two atoms in A that are respectively adjacent to an atom bonded to the pyrazole ring in Formula (I).

Z represents: a monovalent substituent selected from the group consisting of a halogen atom, an alkyl group, a cycloalkyl group, an alkenyl group, an aralkyl group, an aryl group, a heteroaryl group, a cyano group, a hydroxyl group, a nitro group, an amino group, an alkyl amino group, an alkoxy group, an aryloxy group, an aryl amino group, a sulfamoyl amino group, an alkyl thio group, an aryl thio group, an alkoxycarbonyl amino group, a carbamoyl group, a sulfamoyl group, an alkoxycarbonyl group, a heterocyclic oxy group, an acyloxy group, a carbamoyloxy group, a silyloxy group, an aryloxy carbonyl group, an aryloxy carbonyl amino group, a heterocyclic thio group, an acyl group and an ionic hydrophilic group;

or a monovalent substituent obtainable by bonding the monovalent substituent selected from the above-described group and a linking group selected from the group consisting of an amide group, a ureido group, a sulfonamide group, a sulfonyl group, an azo group, an imide group, a sulfinyl group and a phosphoryl group. These monovalent substituents may be further substituted with ionic hydrophilic groups.

In a case in which two Z's are present in Formula (X-1), the two Z's may be the same as or different from each other.

In Formula (X-1), the preferable range of each group of A and Z is as described above.

In Formula (X-1), from the viewpoint of further suppressing bleeding of image, further improving perspiration resistance, and obtaining more favorable hue of a magenta color, Z is preferably a halogen atom, a cyano group, a nitro group, an amino group, an alkyl amino group, an aryl amino group, an ionic hydrophilic group, an alkyl carbonyl amino group, an aryl carbonyl amino group, an alkyl sulfonyl amino group, an arylsulfonyl amino group, or an aryl carbonyl amino group substituted with an ionic hydrophilic group, and is more preferably a halogen atom, a cyano group, an aryl carbonyl amino group, or an aryl carbonyl amino group substituted with an ionic hydrophilic group (preferably an ionic hydrophilic group selected from the group consisting of a carboxy group, a salt of a carboxy group, a sulfo group, and a salt of a sulfo group).

X is still more preferably a group represented by the following Formula (X-2).

By using a group represented by the following Formula (X-2) as X, it is possible to obtain a more favorable hue of a magenta color. Furthermore, it is possible to further suppress bleeding of image and further improve perspiration resistance.

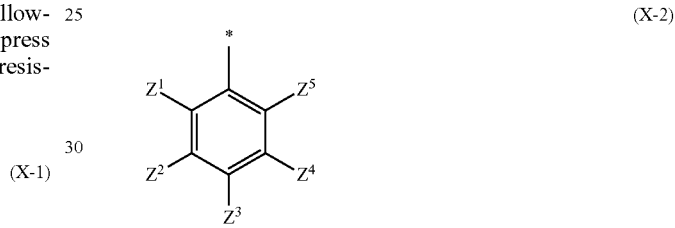

(X-2)

In Formula (X-2), "*" represents a binding site with the pyrazole ring in Formula (I).

In Formula (X-2), each of $Z^1$, $Z^2$, $Z^3$, $Z^4$ and $Z^5$ independently represents a hydrogen atom, a halogen atom, a cyano group, a nitro group, an amino group, an alkyl amino group, an aryl amino group, an ionic hydrophilic group, an alkyl carbonyl amino group, an aryl carbonyl amino group, an alkyl sulfonyl amino group, an aryl sulfonyl amino group, or an aryl carbonyl amino group substituted with an ionic hydrophilic group. However, $Z^1$ and $Z^5$ do not simultaneously represent a hydrogen atom.

In Formula (X-2), the preferable range of each group of $Z^1$, $Z^2$, $Z^3$, $Z^4$ and $Z^5$ is as described above.

In Formula (X-2), from the viewpoint of further suppressing bleeding of image, further improving perspiration resistance, and obtaining more favorable hue of a magenta color, each of $Z^1$, $Z^2$, $Z^3$, $Z^4$ and $Z^5$ particularly preferably independently represents a hydrogen atom, a halogen atom, a cyano group, an aryl carbonyl amino group, or an aryl carbonyl amino group substituted with an ionic hydrophilic group (preferably an ionic hydrophilic group selected from the group consisting of a carboxy group, a salt of a carboxy group, a sulfo group, and a salt of a sulfo group) (here, $Z^1$ and $Z^5$ do not simultaneously represent a hydrogen atom).

Any preferable combination of from $Z^1$ to $Z^5$ in Formula (X-2) is any combination in which each of $Z^1$ and $Z^5$ independently represents a hydrogen atom, a halogen atom, a cyano group, a nitro group, an amino group, an alkyl amino group, an aryl amino group, an ionic hydrophilic group, an alkyl carbonyl amino group, an aryl carbonyl amino group, an alkyl sulfonyl amino group, an arylsulfonyl amino group, or an aryl carbonyl amino group substituted with an ionic hydrophilic group (more preferably, a hydrogen atom, a halogen atom, a cyano group, an aryl carbonyl amino group, or an aryl carbonyl amino group substituted with an ionic hydrophilic group) (here, $Z^1$ and $Z^5$ do not simultaneously represent a hydrogen atom), $Z^3$ represents a halogen atom, a cyano group, a nitro group, an amino group, an alkyl amino group, an aryl amino group, an ionic hydrophilic group, an alkyl carbonyl amino group, an aryl carbonyl amino group, an alkyl sulfonyl amino group, an arylsulfonyl amino group, or an aryl carbonyl amino group substituted with an ionic hydrophilic group (, and more preferably, a halogen atom, a cyano group, an aryl carbonyl amino group, or an aryl carbonyl amino group substituted with an ionic hydrophilic group), and $Z^2$ and $Z^4$ are hydrogen atoms.

Next, any preferable combination of each group in Formula (I), which is preferable from the viewpoint of further suppressing bleeding of image, further improving perspiration resistance, and obtaining more favorable hue of a magenta color, will be described.

Any preferable combination of each group in Formula (I) is any combination in which $R^1$ represents a hydrogen atom, a halogen atom, an alkyl group, or a cyano group, $R^2$ represents a hydrogen atom, a halogen atom, a cyano group, a —$COOR^6$ group, a —$CONR^8R^9$ group, or an ionic hydrophilic group, $R^3$ represents an alkyl group, an aryl group, or an aryl group substituted with an ionic hydrophilic group, each of $R^4$ and $R^5$ independently represents a hydrogen atom, an alkyl group, an aralkyl group, an aryl group, a heteroaryl group, an alkyl group substituted with an ionic hydrophilic group, an aralkyl group substituted with an ionic hydrophilic group, an aryl group substituted with an ionic hydrophilic group, or a heteroaryl group substituted with an ionic hydrophilic group (here, $R^4$ and $R^5$ do not simultaneously represent a hydrogen atom), and $R^{15}$ represents a hydrogen atom, a halogen atom, an alkyl group, or an alkoxy group.

In this combination, X is preferably a group represented by Formula (X-1) (, and more preferably, a group represented by Formula (X-2)). Here, any preferable combination of from $Z^1$ to $Z^5$ in Formula (X-2) is as described above.

Any more preferable combination of each group in Formula (I) is any combination in which $R^1$ represents an alkyl group, $R^2$ represents a halogen atom or a cyano group, $R^3$ represents an alkyl group or an aryl group, each of $R^4$ and $R^5$ independently represents an alkyl group or an alkyl group substituted with an ionic hydrophilic group selected from the group consisting of a carboxy group, a salt of a carboxy group, a sulfo group, and a salt of a sulfo group, and $R^{15}$ represents a hydrogen atom.

In this combination, X is preferably a group represented by Formula (X-1), and more preferably a group represented by Formula (X-2) (, and particularly preferably, each of $Z^1$, $Z^2$, $Z^3$, $Z^4$, and $Z^5$ independently represents a hydrogen atom, a halogen atom, a cyano group, an aryl carbonyl amino group, or an aryl carbonyl amino group substituted with an ionic hydrophilic group selected from the group consisting of a carboxy group, a salt of a carboxy group, a sulfo group, and a salt of a sulfo group). Here, any preferable combination of from $Z^1$ to $Z^5$ in Formula (X-2) is as described above.

Hereinafter, specific examples of the dye represented by Formula (I) (exemplary compounds (1) to (62)) will be shown. The invention is not limited to the following specific examples.

(6)
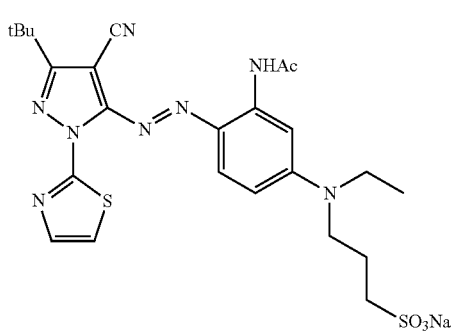
(7)
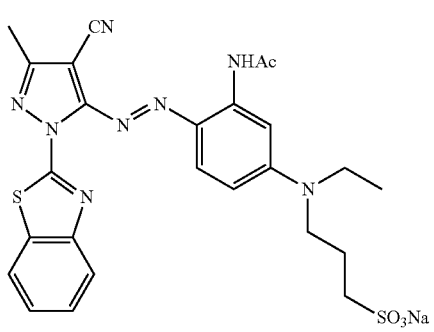
(8)
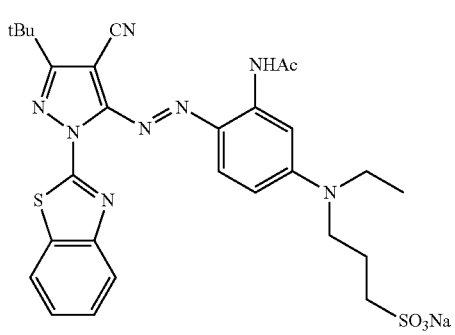
(9)
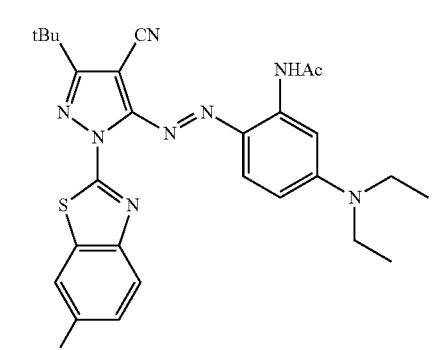
(10)
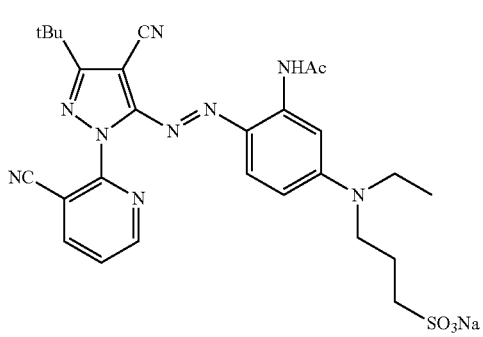
(11)
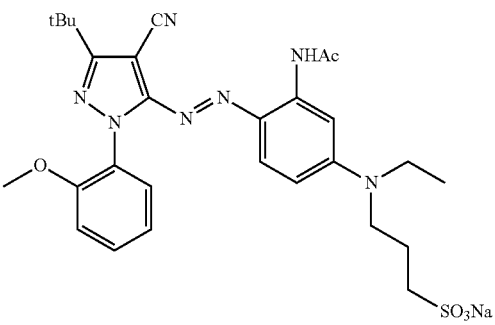
(12)
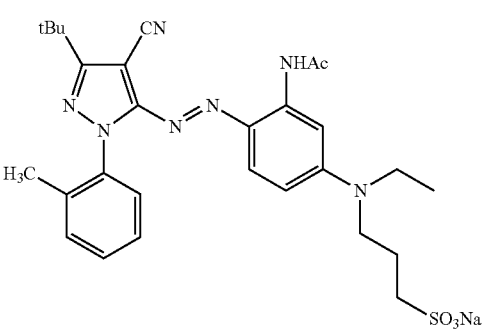
(13)
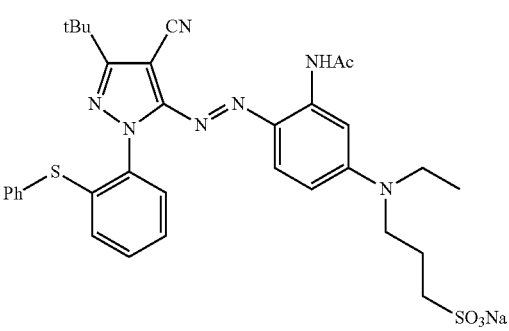
(14)
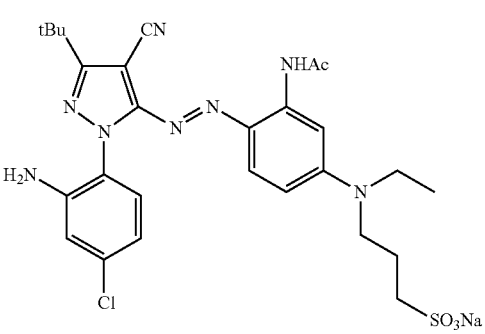

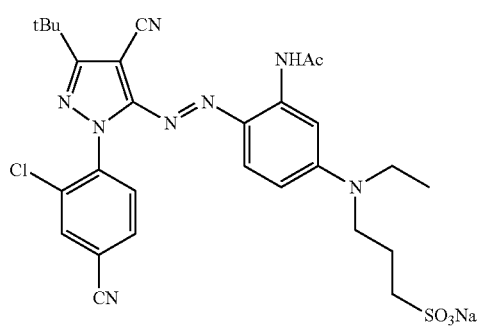
(15)
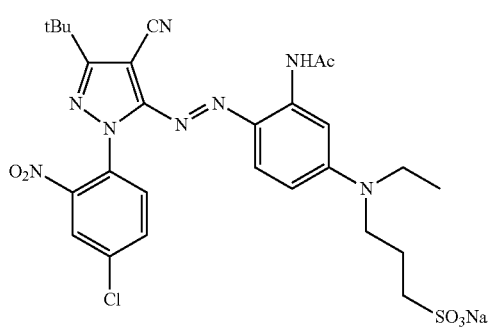
(16)
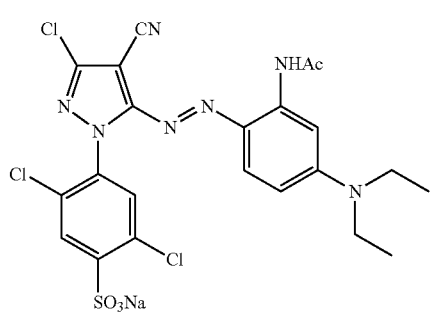
(17)
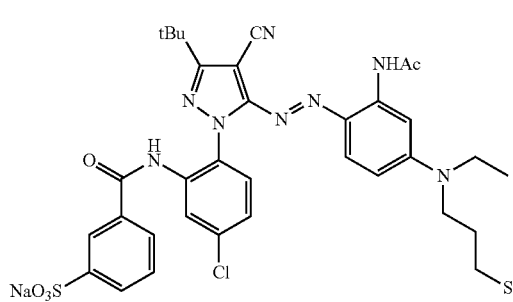
(18)
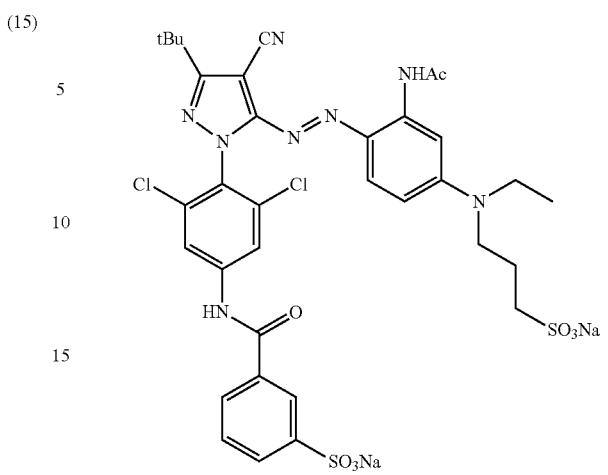
(19)
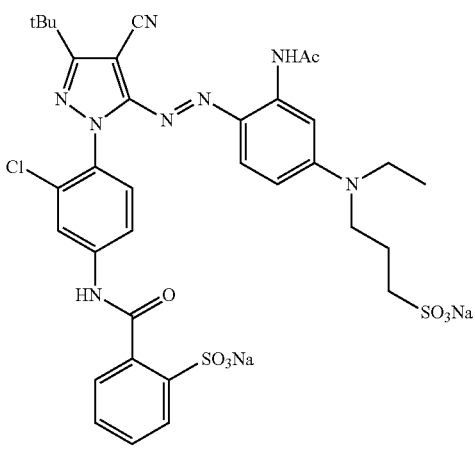
(20)
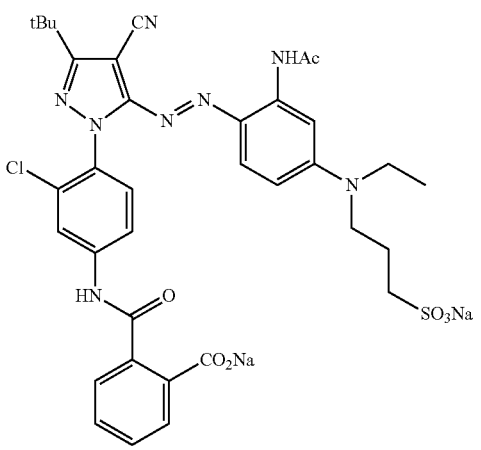
(21)

-continued
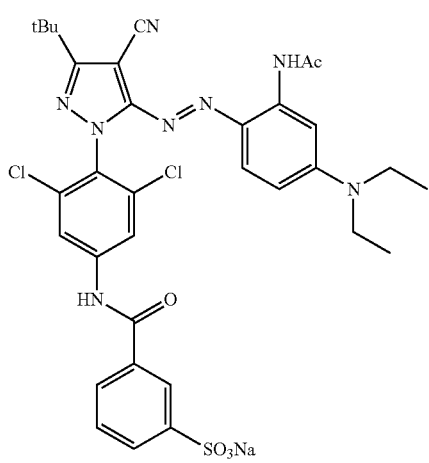
(22)
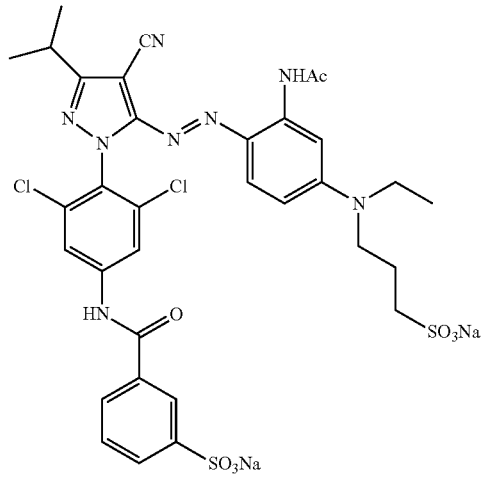
(25)
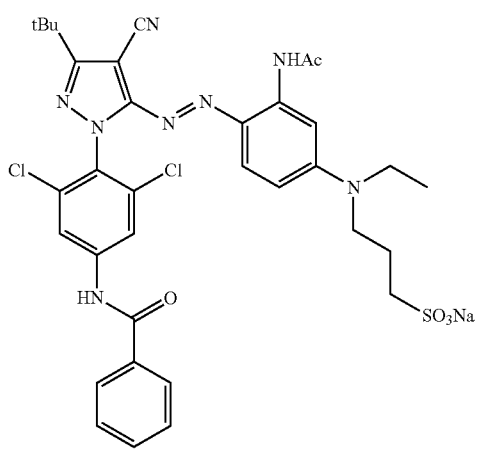
(23)
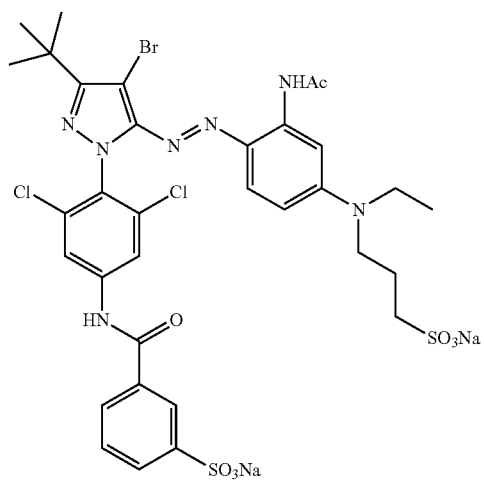
(26)
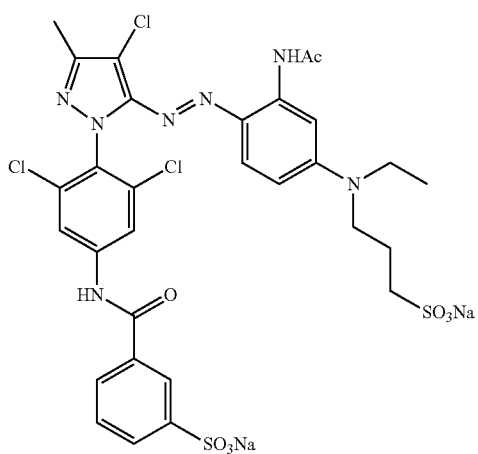
(24)
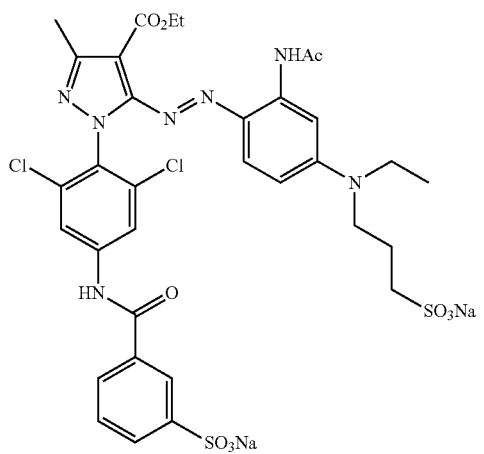
(27)

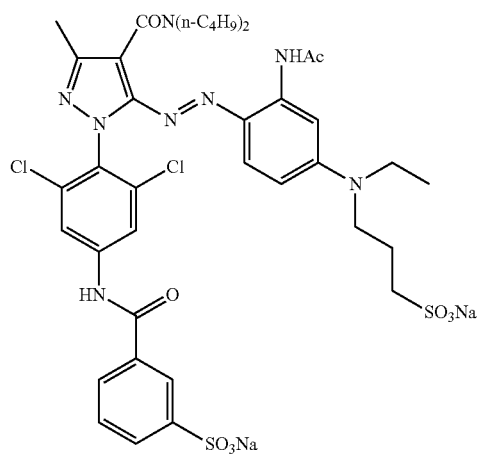
(28)
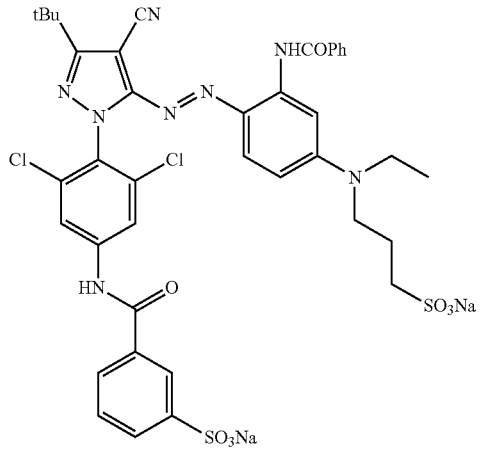
(31)
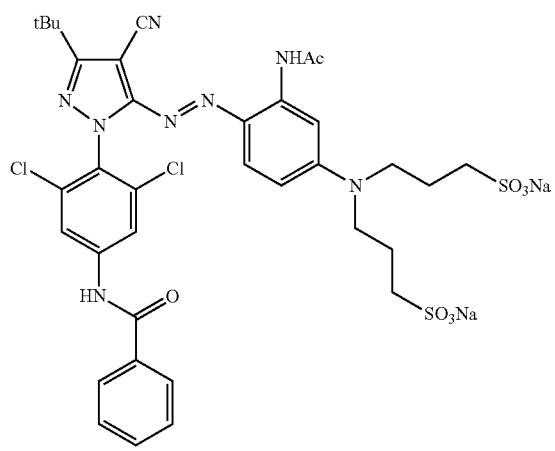
(29)
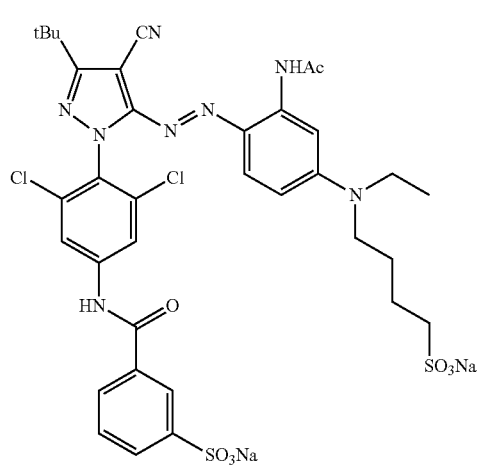
(30)
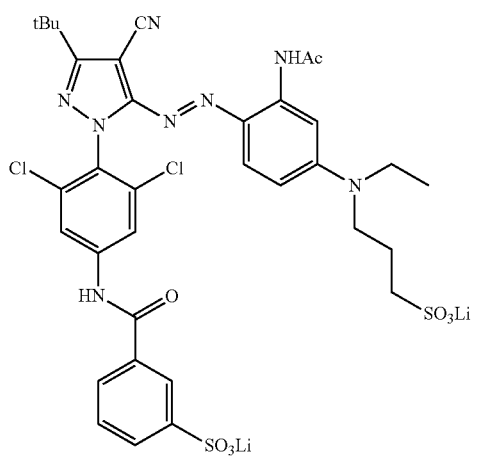
(32)
(33)

-continued
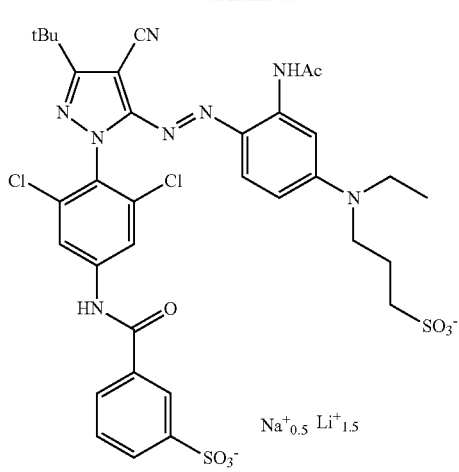
(34)
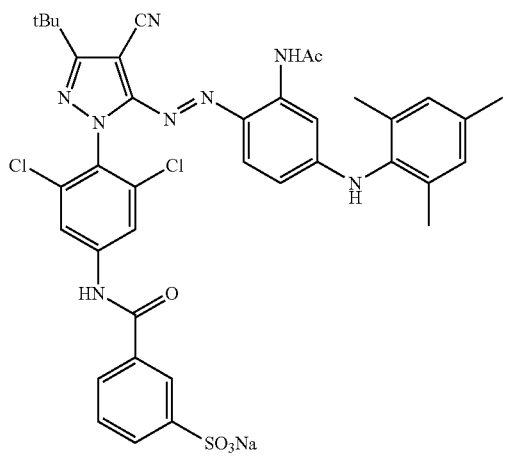
(37)
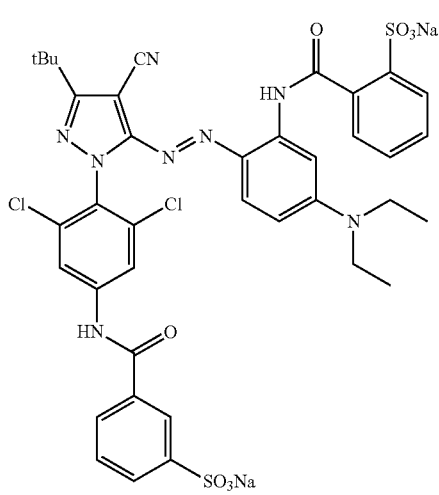
(35)
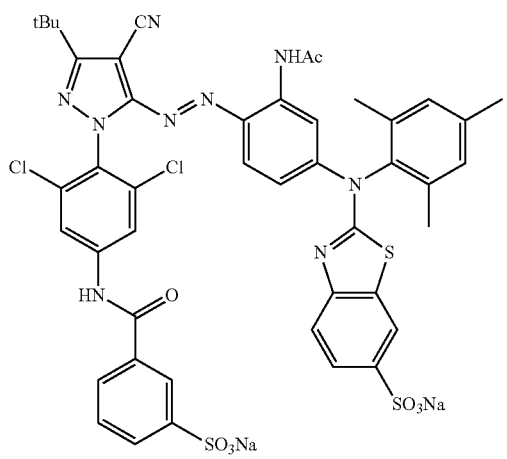
(38)
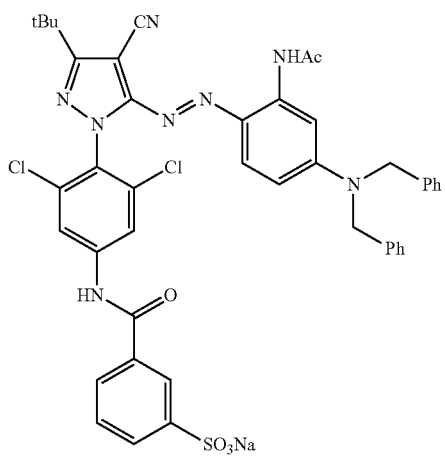
(36)
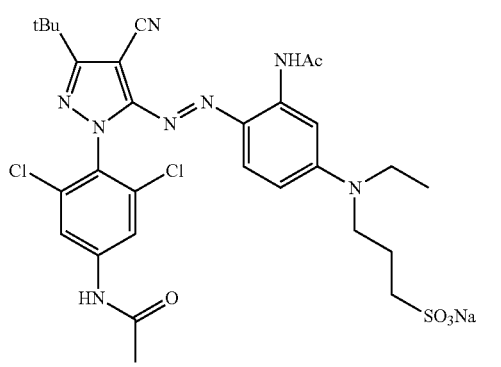
(39)

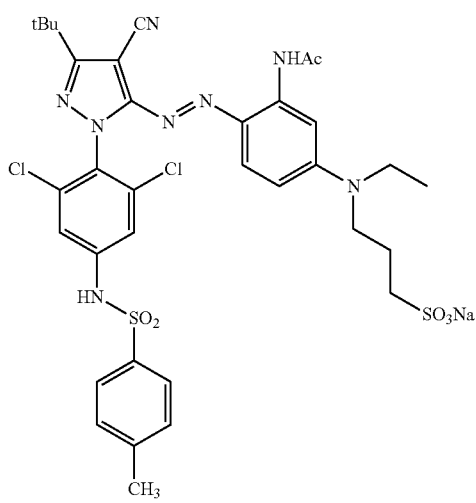
(40)
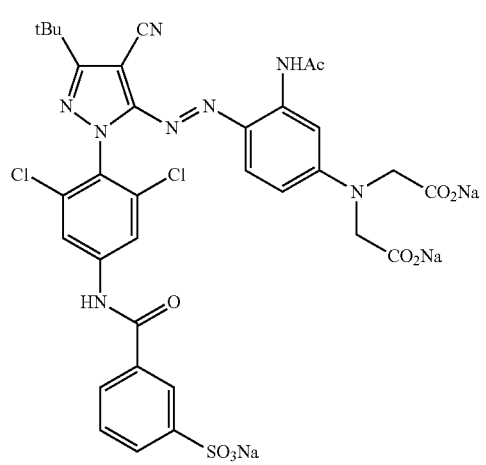
(43)
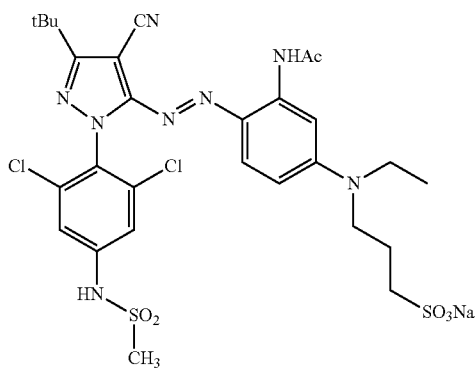
(41)
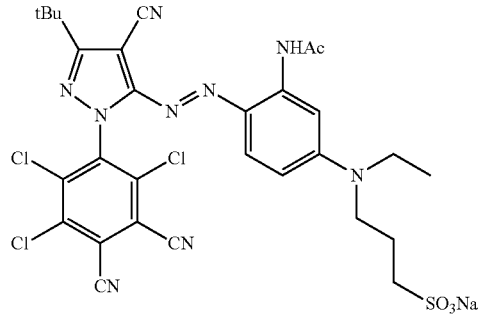
(44)
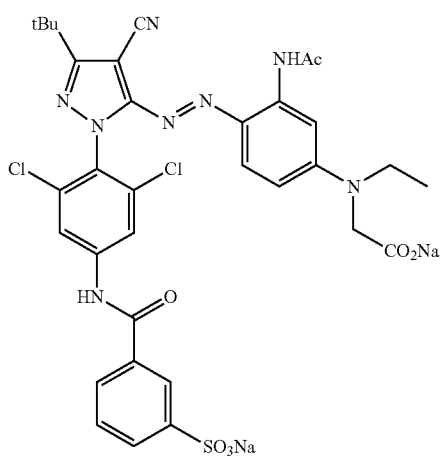
(42)
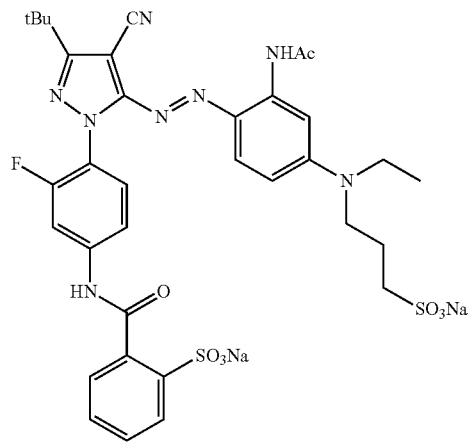
(45)

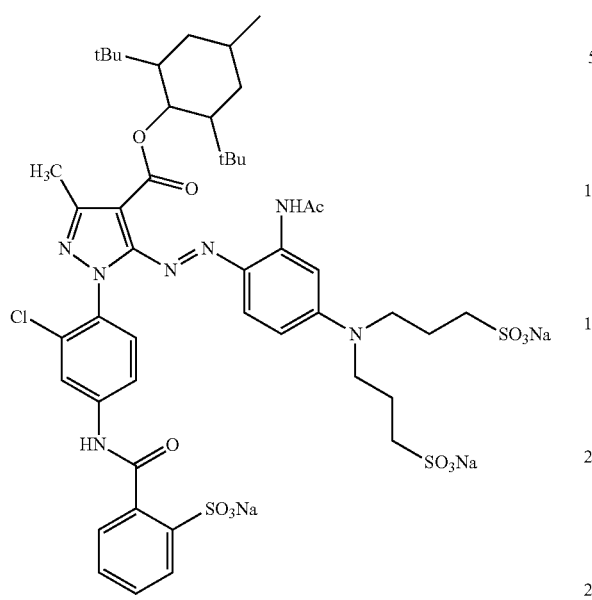
(46)
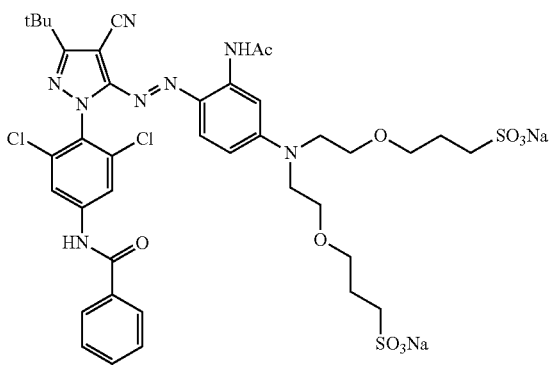
(47)
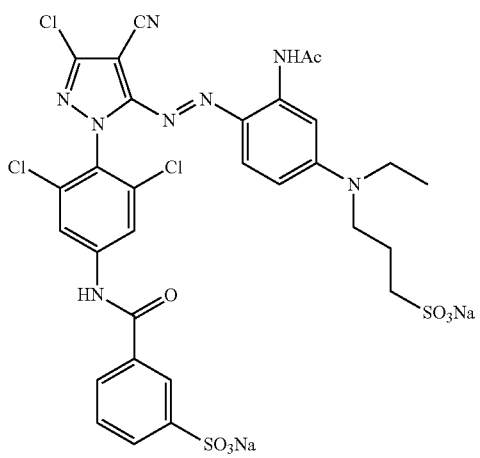
(48)
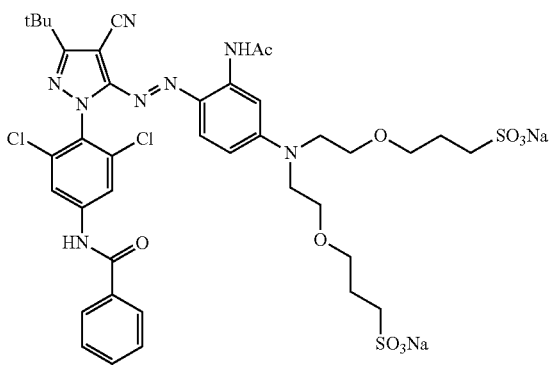
(49)
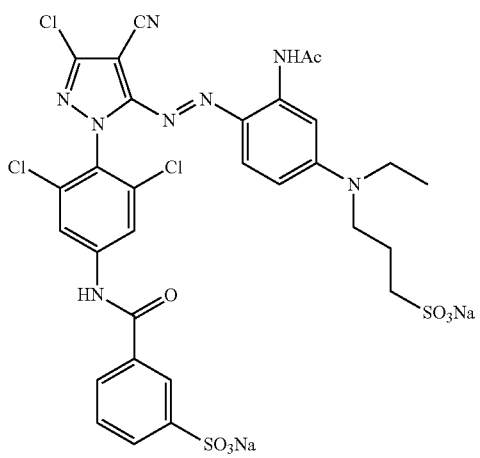
(50)
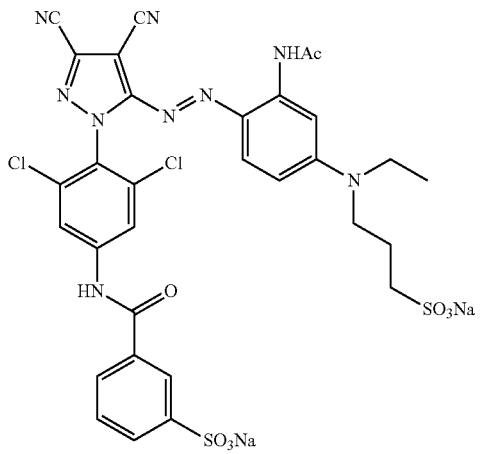
(51)

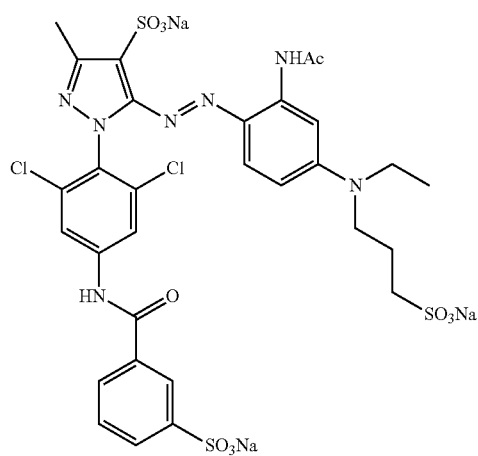
(52)
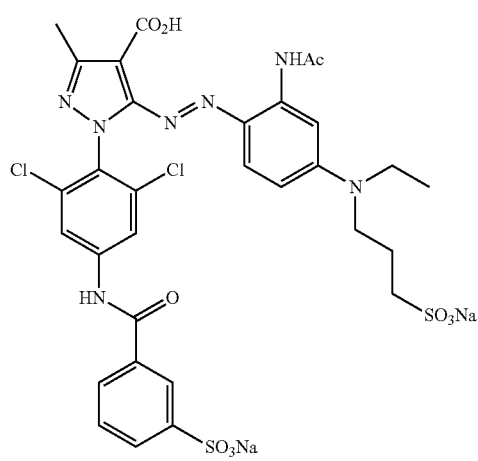
(53)
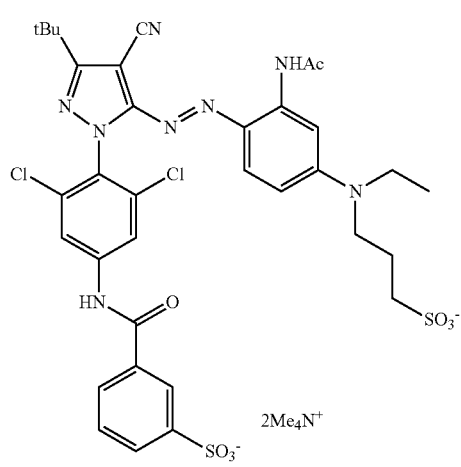
(54)
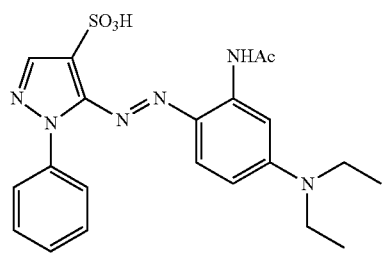
(55)
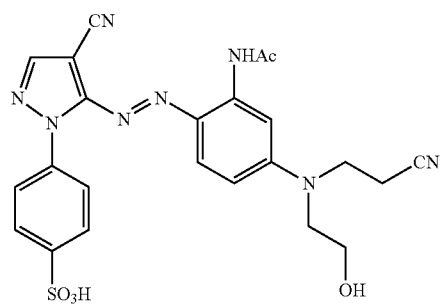
(56)
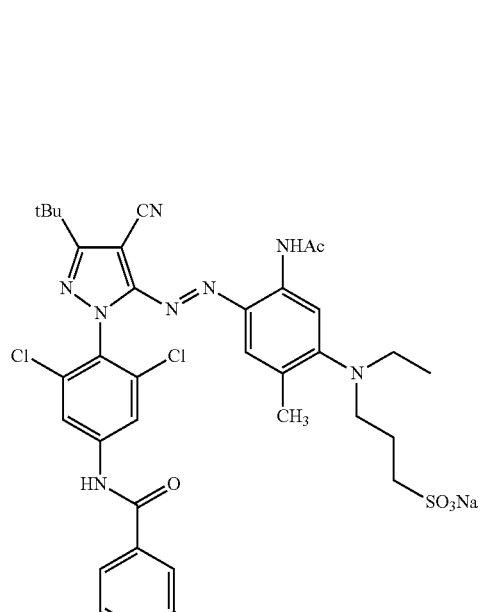
(57)
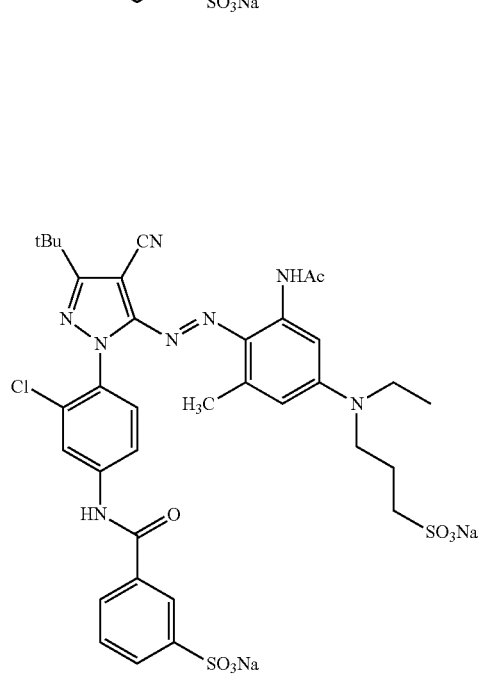
(58)

-continued

(59)
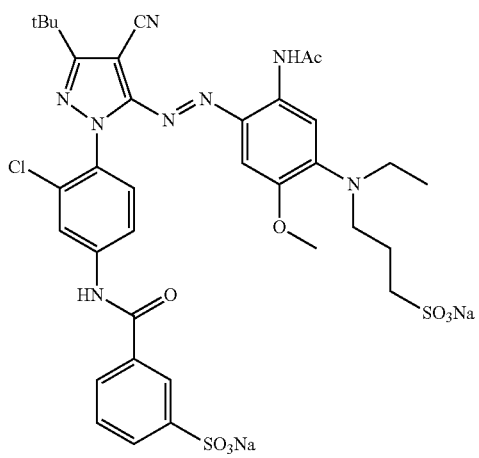

(60)
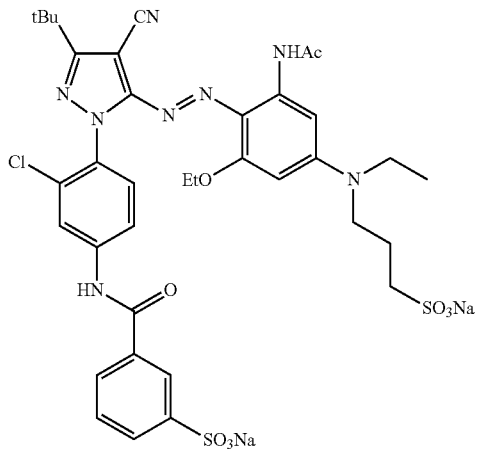

(61)
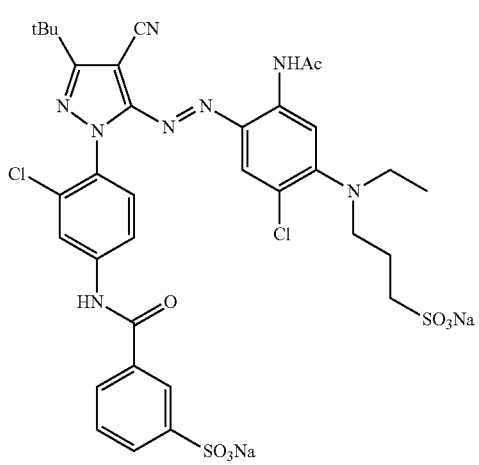

-continued

(62)
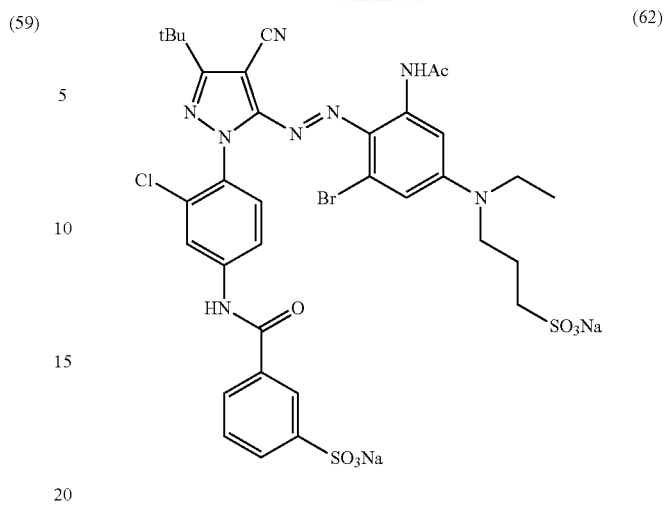

The dye represented by Formula (I) can be synthesized by, for example, a known synthesis method using a diazo coupling reaction. As details of the synthesis method, for example, a method described in JP-A No. 2001-335714 can be referred to.

The dye represented by Formula (I) may be used singly, or in combination of two or more kinds thereof.

The coloring composition of the invention may contain only the dye represented by Formula (I) as a colorant, and may further contain a colorant other than the dye represented by Formula (I), within a range not impairing the effect of the invention.

In a case in which the coloring composition of the invention contains a colorant other than the dye represented by Formula (I), a content of the dye represented by Formula (I) in all the colorants is preferably 50% by mass or greater, more preferably 80% by mass or greater, particularly preferably 90% by mass or greater, and most preferably 100% by mass, with respect to a total mass of the colorants.

In consideration of storage stability of a coloring composition for inkjet textile printing and obtaining a sufficient color forming density, a content of the dye represented by Formula (I) in the coloring composition of the invention is preferably from 0.1% by mass to 20% by mass, more preferably from 0.2% by mass to 15% by mass, still more preferably from 0.2% by mass to 10% by mass, and particularly preferably from 0.2% by mass to 8% by mass, with respect to a total mass of the coloring composition for inkjet textile printing.

The coloring composition of the invention includes water in addition to the dye represented by Formula (I). Furthermore, the coloring composition of the invention may include a component such as an organic solvent or a surfactant if necessary.

<Water>

Water included in the coloring composition of the invention is not particularly limited, and may be ion exchanged water or tap water.

In a case in which the coloring composition includes only the dye represented by Formula (I), a content of water in the coloring composition is a remainder obtained by subtracting a content of the dye represented by Formula (I) from a total mass of the coloring composition, and in a case in which the coloring composition includes an additional component(s) described below, the content of water in the coloring composition is a remainder obtained by subtracting the total content of the dye represented by Formula (I) and the additional component(s) from the total mass of the coloring composition.

<Organic Solvent>

The coloring composition of the invention may include an organic solvent.

The organic solvent is preferably an aqueous organic solvent, and examples thereof include polyols (for example, ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butylene glycol, 1,6-hexanediol, 1,2-hexanediol, 1,5-pentanediol, 1,2-pentanediol, 2,2-dimethyl-1,3-propanediol, 2-methyl-2,4-pentanediol, 3-methyl-1,5-pentanediol, 3-methyl-1,3-butanediol, and 2-methyl-1,3-propanediol), amines (for example, ethanolamine and 2-(dimethylamino)ethanol), monovalent alcohols (for example, methanol, ethanol, and butanol), alkyl ethers of polyols (for example, diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'-thiodiethanol, amides (for example, N,N-dimethylformamide), heterocyclic compounds (2-pyrrolidone and the like), and acetonitrile.

In a case in which the coloring composition of the invention includes an organic solvent, a content of the organic solvent is preferably from 1% by mass to 60% by mass, and more preferably from 2% by mass to 50% by mass, with respect to a total mass of the coloring composition.

<Surfactant>

A surfactant can be used in the coloring composition of the invention from the viewpoint of enhancing storage stability, jetting stability, jetting precision, or the like, As the surfactant, any surfactant from a cationic surfactant, an anionic surfactant, an amphoteric surfactant, and a nonionic surfactant can be used.

Examples of the cationic surfactant include an aliphatic amine salt, an aliphatic quaternary ammonium salt, a benzalkonium salt, benzethonium chloride, a pyridinium salt, and an imidazolium salt.

Examples of the anionic surfactant include a fatty acid soap, an N-acyl-N-methyl glycine salt, an N-acyl-N-methyl-β-alanine salt, an N-acyl glutamic acid salt, an alkyl ether carboxylate, an acylated peptide, an alkyl sulfonate, an alkyl benzene sulfonate, an alkyl naphthalene sulfonate, a dialkyl sulfosuccinate, an alkyl sulfoacetate, an α-olefin sulfonate, N-acylmethyl taurine, sulfated oil, a higher alcohol sulfuric acid ester salt, a secondary higher alcohol sulfuric acid ester salt, an alkyl ether sulfate, a secondary higher alcohol ethoxy sulfate, a polyoxy ethylene alkyl phenyl ether sulfate, a monoglysulfate, a fatty acid alkylolamide sulfuric acid ester salt, an alkyl ether phosphoric acid ester salt, and an alkyl phosphoric acid ester salt.

Examples of the amphoteric surfactant include a carboxybetaine surfactant, a sulfobetaine surfactant, an aminocarboxylic acid salt, and an imidazolinium betaine.

Examples of the nonionic surfactant include polyoxyethylene alkyl ether, polyoxyethylene secondary alcohol ether, polyoxyethylene alkyl phenyl ether, polyoxyethylene sterol ether, a polyoxyethylene lanolin derivative, polyoxyethylene polyoxypropylene alkyl ether, polyoxyethylene glycerin fatty acid ester, polyoxyethylene castor oil, hydrogenated castor oil, polyoxyethylene sorbitan fatty acid ester, polyoxyethylene sorbitol fatty acid ester, polyethylene glycol fatty acid ester, fatty acid monoglyceride, polyglycerol fatty acid ester, sorbitan fatty acid ester, propylene glycol fatty acid ester, sucrose fatty acid ester, fatty acid alkanol amide, polyoxy ethylene fatty acid amide, polyoxy ethylene alkyl amine, alkyl amine oxide, acetylene glycol, and acetylene alcohol.

In the case of using each of these surfactants, the surfactant may be used singly, or in mixture of two or more kinds thereof.

In a case in which the coloring composition of the invention includes a surfactant, a content of the surfactant is preferably in a range of from 0.001% by mass to 5.0% by mass with respect to a total mass of the coloring composition, and surface tension of the coloring composition is preferably arbitrarily adjusted within the range.

<Preservative and Antifungal Agent>

The coloring composition of the invention may contain at least one of a preservative or an antifungal agent to maintain long-term storage stability. Examples of the preservative or the antifungal agent include an aromatic halogen compound (for example, PREVENTOL CMK; manufactured by LANXESS), methylenedithio cyanate, a halogen-containing nitrogen sulfur compound, and 1,2-benzisothiazolin-3-one (for example, PROXEL GXL; manufactured by Arch Chemicals, Inc.).

<Various Additives>

The coloring composition of the invention may contain a conventionally known additive in addition to the above. Examples thereof include a pH adjuster such as acid-base or a buffer solution, a fluorescent brightening agent, a defoamer, a lubricant, a thickener, an antistatic agent, a matting agent, an antioxidant, a specific resistance modifier, an anticorrosive agent, an inorganic pigment, and an anti-reducing agent.

It is possible to form an image on a fabric by inkjet textile printing using the coloring composition of the invention described above.

The kind of the fabric is not particularly limited, and it is possible to use a fabric formed from including various fibers such as rayon, cotton, a polyester fiber, or a polyamide fiber. Among these, from the viewpoint of sufficiently exerting an effect of the invention, fabrics including a polyamide fiber are preferable, and among these, nylon, silk, or wool is preferable.

<<Textile Printing Method>>

The textile printing method, that is one embodiment of the invention, is a method of applying the coloring composition of the invention onto a fabric including a polyamide fiber (for example, nylon, silk, or wool) by an inkjet method.

Since the coloring composition of the invention is a coloring composition which has excellent stability in being jetted from inkjet nozzles and is capable of forming an image with suppressed bleeding and excellent perspiration resistance (resistance with respect to perspiration), an image in which bleeding is suppressed and perspiration resistance is excellent is stably formed on a fabric by the textile printing method of the invention.

Any known method of jetting a coloring composition (ink) from inkjet nozzles may be used as a method of applying the coloring composition (ink) by an inkjet method without particular limitation.

In the textile printing method of the invention, in addition to the application of the coloring composition (ink) onto a fabric, a pretreatment or a post-treatment may be performed before and/or after the application, if necessary.

<Pretreatment>

In the textile printing method of the invention, a pretreatment is preferably performed with respect to a fabric before the coloring composition of the invention is applied. By this, fixability of the dye to the fabric is further improved.

As the pretreatment, a treatment of applying a pretreatment agent onto a fabric before the coloring composition is applied can be exemplified.

As the pretreatment agent, for example, it is possible to use at least one of a hydrotropic agent, an aqueous (water-soluble) metal salt, a pH adjuster, a pH buffer, or an aqueous (water-soluble) polymer. The pretreatment agent may include a water repellent or a surfactant, if necessary. The pretreatment agent may include an additive such as an anti-reducing agent, an antioxidant, a level dyeing agent, a deep dyeing agent, a carrier, a reducing agent, or an oxidizing agent according to properties of a dye used.

Examples of the hydrotropic agent include an alkylurea such as urea, dimethylurea, thiourea, monomethylthiourea, or dimethylthiourea.

Examples of the pH adjuster include an acid ammonium salt such as an ammonium sulfate or an ammonium tartrate.

Examples of the aqueous polymer include a natural aqueous polymer and a synthetic aqueous polymer. Examples of the natural aqueous polymer include: a starch material such as corn or wheat; a cellulose polymer such as carboxymethyl cellulose, methylcellulose, or hydroxyethyl cellulose; a polysaccharide polymer such as sodium alginate, gum arabic, locust bean gum, Tragacanth gum, guar gum, or a tamarind seed; a protein material such as gelatin or casein; a tannin material; and a lignin material.

Examples of the synthetic aqueous polymer include a known polyvinyl alcohol compound, polyethylene oxide compound, an acrylic acid aqueous polymer, and a maleic anhydride aqueous polymer.

As the aqueous polymer, a polysaccharide polymer or a cellulose polymer is preferable.

Examples of the aqueous metal salt include an alkali metal salt and an alkaline earth metal salt. As the aqueous metal salt, a compound that forms a typical ion crystal and has pH of 4 to 10 is preferable.

Representative examples of the aqueous metal salt include NaCl, $Na_2SO_4$, KCl, $CH_3COONa$, and the like as the alkali metal salt, and $CaCl_2$, $MgCl_2$, and the like as the alkaline earth metal salt.

As the aqueous metal salt, a sodium salt, a potassium salt, or a calcium salt is preferable, and NaCl, $Na_2SO_4$, KCl, $CH_3COONa$, or $CaCl_2$ is more preferable.

Examples of the water repellent include a paraffin compound, a fluorine-containing compound, a pyridinium salt, N-methylol alkyl amide, alkyl ethylene urea, an okizarin derivative, a silicone compound, a triazine compound, a zirconium compound, or mixtures of these, and the invention is not particularly limited thereto. Among these water repellents, a paraffin water repellent or a fluorine-containing water repellent is particularly preferable in terms of prevention of bleeding or a density.

In the case of applying a water repellent onto a fabric as the pretreatment, the amount of the water repellent applied onto the fabric is preferably in a range of from 0.05% by mass to 40% by mass, and more preferably in a range of from 0.5% by mass to 10% by mass, with respect to a total mass of the fabric. In the case in which the applied amount of a water repellent is 0.05% by mass or greater, it is possible to further suppress excessive penetration of the coloring composition into a fabric.

As the surfactant, it is possible to use an anionic surfactant, a nonionic surfactant, an amphoteric surfactant (a betaine surfactant or the like), or the like. As the surfactant, a nonionic surfactant having HLB of 12.5 or greater is preferably used, and a nonionic surfactant having HLB of 14 or greater is more preferably used.

In the case of applying a surfactant onto a fabric as the pretreatment, from 0.01% by mass to 30% by mass of the surfactant with respect to a total mass of the fabric is preferably used.

In the pretreatment, a pretreatment agent is preferably applied (for example, by patting) onto a fabric in an expression of a range of from 5% to 150% (more preferably, from 10% to 130%).

In the pretreatment, a method of applying a pretreatment agent onto a fabric is not particularly limited, and examples thereof include an immersion method, a pat method (patting method), a coating method, a spraying method, and an inkjet method, which are usually performed.

<Post-Treatment>

In the textile printing method of the invention, a post-treatment is preferably performed with respect to a fabric onto which the coloring composition of the invention is applied. By this, fixing of the dye to the fabric is further promoted.

As the post-treatment, a treatment including a steam treatment step (steaming) or a washing step is suitable. The post-treatment may include a preliminary drying step provided before the steam treatment step, or may include a drying step provided after the washing step. Hereinafter, each of these steps will be described.

(Preliminary Drying Step)

The preliminary drying step is provided before the steam treatment step (steaming), and is a step of preliminarily drying a fabric onto which the coloring composition of the invention is applied. Here, the preliminary drying also includes penetration of the coloring composition penetrating into a fabric.

By providing the preliminary drying step, it is possible to further improve image density, and it is possible to effectively suppress bleeding.

The method of preliminary drying is not particularly limited, and for example, the method of preliminary drying may be air-drying, or may be drying using a dryer.

Examples of the drying method using a dryer include air convection, direct contacting of a heating roll, and irradiation.

The conditions of the preliminary drying are not particularly limited, and for example, conditions of a temperature range of from room temperature to 150° C. and a period of time of from 0.5 minutes to 30 minutes can be used.

The preliminary drying step may be provided as one step in continuous steps.

Examples of the continuous steps include an embodiment in which preliminary drying using a dryer is performed between image formation and fabric rolling in a textile printing method including operations which continuously perform supplying a roll-shaped fabric to an inkjet image forming apparatus, performing image formation while drawing out the fabric, and rolling the fabric on which an image is formed is rolled.

The dryer may be a dryer directly connected to an inkjet textile printing machine, or may be a dryer separated from an inkjet printing machine. Preferable conditions of the preliminary drying are as described above.

(Steam Treatment Step)

The steam treatment step is a step of performing a steam treatment with respect to a fabric onto which the coloring composition of the invention is applied (preliminarily dried, if necessary).

By providing the steam treatment step, it is possible to further improve fixability of the dye to a fabric, and it is possible to further improve image density.

The time of the steam treatment, for example, can be from 1 minute to 120 minutes, preferably from 3 minutes to 90 minutes, and more preferably from 3 minutes to 60 minutes.

The conditions of the steam treatment, in particular, the time, are also preferably varied according to the kind of fabric. For example, in a case in which the fabric includes wool, the time of the steaming is preferably about from 1 minute to 120 minutes, and more preferably about from 3 minutes to 90 minutes. In a case in which the fabric includes silk, the time is preferably about from 1 minute to 40 minutes, and more preferably about from 3 minutes to 30 minutes. In a case in which the fabric includes nylon, the time is preferably about from 1 minute to 90 minutes, and more preferably about from 3 minutes to 60 minutes.

(Washing Step)

The cleaning step is a step of cleaning a fabric after the steam treatment step.

By the cleaning step, it is possible to wash away the dye that is not fixed on the fabric. By this, it is possible to further improve fastness of an image such as perspiration resistance.

As the method of washing, a conventionally known washing method can be adopted.

In washing, for example, water in a range of from room temperature to 100° C. or warm water, and/or an anioinic soaping agent or a nonionic soaping agent is preferably used.

(Drying Step)

The drying step is a step of drying a fabric after the washing step.

The method of drying in the drying step is not particularly limited, and for example, the method of drying may be air-drying, or may use a dryer, a heat roll, or an iron.

In addition, before the drying, the fabric after the washing step is preferably squeezed and/or dehydrated.

<<Fabric>>

The fabric, that is one embodiment of the invention, is a fabric printed by the textile printing method of the invention. Thus, an image formed on the fabric of the invention has properties of suppression of bleeding and excellent perspiration resistance.

The fabric includes a polyamide fiber (preferably, nylon, silk, and/or wool).

The fabric may be any form of a woven fabric, a knitted fabric, and a non-woven fabric.

The fabric including a polyamide fiber is suitably a fabric in which a content of a polyamide fiber with respect to a total mass thereof is 100% by mass, and the fabric may include a material other than the polyamide fiber. In this case, a polyamide fiber is included in the fabric by blended spinning, union, twisted union, or the like. In a case in which the fabric includes a fiber other than the polyamide fiber, the content of the polyamide fiber is preferably 30% by mass or greater, and more preferably 50% by mass or greater with respect to a total mass of the fabric. A blended woven fabric or a blended non-woven fabric of the polyamide fiber blended with, for example, rayon, cotton, acetate, polyurethane, or acrylic fiber, can be used as a fabric for textile printing.

There are suitable ranges of physical properties for polyamide fibers which form the fabric and for yarn formed from a polyamide fiber. For example, in a case in which the polyamide is nylon, an average thickness of a nylon fiber may be regulated to be in a range of from 1 d (denier) to 10 d, which is preferably from 2 d to 6 d, and an average thickness of a nylon yarn formed from the nylon fiber may be regulated to be in a range of from 20 d to 100 d, which is preferably from 25 d to 80 d, and more preferably from 30 d to 70 d. In addition, in a case in which the polyamide is silk, as a characteristic of a fiber itself, an average thickness of a silk fiber may be regulated to be in a range of from 2.5 d to 3.5 d, which is preferably from 2.7 d to 3.3 d, and an average thickness of a silk yarn formed from the silk fiber may be regulated to be in a range of from 14 d to 147 d, which is preferably from 14 d to 105 d, and a fabric which is made therefrom by a known method can be used.

EXAMPLES

Hereinafter, the invention will be further specifically described using Examples, however, the invention is not limited to the following Examples as long as it does not depart from the scope thereof. Moreover, "parts" and "%" are on mass unless specified otherwise.

Example 1

Preparation of Ink (Coloring Composition)

The components of the following composition were mixed, and, the obtained mixture was stirred for 2 hours. The the mixture was passed through a membrane filter (filter pore size: 0.45 um), whereby an ink (coloring composition) having a dye concentration of 2% by mass was obtained.

—Composition of Ink (Coloring Composition)—

A colorant shown in Table 1 (exemplary compound (1), which is a specific example of the dye represented by Formula (1)) 2 parts Glycerin [manufactured by Wako Pure Chemical Industries, Ltd.] (aqueous organic solvent) 10 parts Diethylene glycol [manufactured by Wako Pure Chemical Industries, Ltd.] (aqueous organic solvent) 10 parts OLFINE E1010 [trade name, manufactured by Nissin Chemical Industry Co., Ltd.] (acetylene glycol surfactant) 1 part Water 77 parts <Preparation of Pretreatment Agent>

The components of the following composition were mixed, whereby a pretreatment agent was obtained.

—Preparation of Pretreatment Agent—

Guar gum [trade name: MEYPRO GUM NP, manufactured by Nissho Corporation] 2 parts Urea [manufactured by Wako Pure Chemical Industries, Ltd.] 5 parts Ammonium sulfate [manufactured by Wako Pure Chemical Industries, Ltd.] 4 parts Water 89 parts <Production of Printed Sample>

A fabric made of silk was patted with the above-obtained pretreatment agent as an expression of 90%, whereby a fabric treated with the pretreatment agent was obtained (pretreatment).

The above-obtained ink was set in an inkjet printer (trade name: PX-V630, manufactured by Seiko Epson Corp.). Using this printer, a solid image was formed by the ink on the fabric treated with the pretreatment agent.

The fabric after the image formation was air-dried, and then, the fabric was heated for 8 minutes in normal-pressure steam.

The fabric after heating was washed for 5 minutes using flowing water at room temperature, then, washed for 5 minutes using flowing water at 60° C., and washed for 30 seconds using flowing water at room temperature. After that, the fabric was air-dried, whereby a printed sample was obtained.

<Evaluation>

The following evaluation was performed on the above-obtained ink, the printed sample, and a sample for a bleeding evaluation described below.

The evaluation results are shown in the following Table 1.

(Jetting Stability)

The above-obtained ink was set in the inkjet printer (trade name: PX-V630, manufactured by Seiko Epson Corp.), and a 5 cm-square pattern image was formed on color/monochrome papers (trade name: C2, manufactured by Fuji Xerox Co., Ltd.) 20 times. The image formed for the first time and the image formed for the 20th time were visually observed, and jetting stability of ink was evaluated according to the following criteria.

—Evaluation Criteria of Jetting Stability of Ink—

A . . . In the 20th image, neither blur nor density unevenness were observed.

B . . . In the first image, neither blur nor density unevenness were observed, however, in the 20th image, at least one of blur or density unevenness was observed.

C . . . In the first image, at least one of blur or density unevenness was observed.

(Color)

The color of the above-described printed sample was visually observed.

(Perspiration Resistance)

The evaluation of perspiration resistance was performed on the above-described printed sample by the following method.

That is, by a technique using "Test method for color fastness to perspiration (JIS L 0848)", color transfer from the printed sample to an attached white silk fabric was observed using alkaline perspiration, and the perspiration resistance of an image was evaluated according to the following evaluation criteria.

In the following evaluation criteria, in a case of A or B, the perspiration resistance of an image is in a practically acceptable range.

—Evaluation Criteria of Perspiration Resistance—

A . . . Color transfer from the printed sample to an attached white silk fabric was not observed.

B . . . Although color transfer from the printed sample to an attached white silk fabric was slightly observed, it was in a practically acceptable range.

C . . . Color transfer from the printed sample to an attached white silk fabric was significantly observed, and it was above the practically acceptable range.

(Bleeding)

A sample for a bleeding evaluation was produced in the same manner as in the production of the above-described printed sample, except that an image (hereinafter, also referred to as "alphabetical image") of alphabetical letters having a size of 5 mm was formed instead of the above-described solid image.

The alphabetical image of the obtained sample for a bleeding evaluation was visually observed, and bleeding of the image was evaluated according to the following evaluation criteria.

In the following evaluation criteria, in a case of A or B, the bleeding of the image is in a practically acceptable range.

—Evaluation Criteria of Bleeding—

A . . . Bleeding of the alphabetical image was not observed, and the alphabetical letters could be easily discriminated.

B . . . Although bleeding of the alphabetical image was slightly observed, the alphabetical letters could be discriminated, and the bleeding of the image was in a practically acceptable range.

C . . . Bleeding of the alphabetical image was significantly observed, the alphabetical letters could not be discriminated, and the bleeding of the image was above the practically acceptable range.

Examples 2 to 20, 22, and 23, and Comparative Examples 4 to 6

The same evaluation as in Example 1, except that the colorant in the ink in Example 1 was replaced by colorants shown in the following Table 1 was performed.

The evaluation results are shown in the following Table 1.

Example 21

The evaluation of ink manufacture and the printed sample was performed in the same manner as in Example 9, except that the amount of the dye in the ink in Example 9 was changed to 5 parts, and the amount of water in the ink was changed to 74 parts (that is, the dye concentration in the ink was changed to 5% by mass).

The evaluation results are shown in the following Table 1.

Comparative Examples 1 to 3 and 7

The evaluation of color and perspiration resistance was performed in the same manner as in Example 1, except that the colorant in the ink in Example 1 was replaced by colorants shown in the following Table 1, and the method of producing the printed sample was changed as follows.

The evaluation results of color and perspiration resistance are shown in the following Table 1.

Here, in Comparative Example 7, an ink was produced by dispersing Comparative compound (d) in water according to Example 104 in JP-A No. S51-95431.

In addition, since the inks in Comparative Examples 1 to 3 and 7 were hardly jetted from inkjet nozzles, it was not possible to form an image using an inkjet printer, and thus, it was not possible to evaluate the bleeding of the image therewith. Therefore, a printed sample was produced by the following method, and using the obtained sample, only the evaluation of color and perspiration resistance was performed.

Production of Printed Sample

Comparative Examples 1 to 3 and 7

Respective printed samples of Comparative Examples 1 to 3 and 7 were produced in the same manner as in the production of the printed sample in Example 1, except that the operation of forming a solid image by an ink on the fabric treated with the pretreatment agent using an inkjet printer in the production of the printed sample in Example 1 was replaced by an operation in which: an ink was dropped on a glass plate; a surface of the fabric treated with the pretreatment agent, on which a pretreatment was applied was placed to face the underside on spread ink droplets; and the ink was absorbed into the fabric treated with the pretreatment agent.

TABLE 1

| | Colorant | Jetting stability | Color | Perspiration resistance | Bleeding |
|---|---|---|---|---|---|
| Example 1 | Exemplary compound (1) | A | Magenta | B | B |
| Example 2 | Exemplary compound (8) | A | Purplish magenta | B | B |
| Example 3 | Exemplary compound (9) | A | Purplish magenta | B | B |
| Example 4 | Exemplary compound (7) | A | Magenta | B | B |
| Example 5 | Exemplary compound (15) | A | Magenta | A | A |
| Example 6 | Exemplary compound (14) | A | Red | B | B |
| Example 7 | Exemplary compound (16) | A | Magenta | B | B |
| Example 8 | Exemplary compound (18) | A | Magenta | A | A |
| Example 9 | Exemplary compound (19) | A | Magenta | A | A |
| Example 10 | Exemplary compound (20) | A | Magenta | A | A |
| Example 11 | Exemplary compound (21) | A | Magenta | A | A |
| Example 12 | Exemplary compound (22) | A | Magenta | A | A |
| Example 13 | Exemplary compound (23) | A | Magenta | A | A |
| Example 14 | Exemplary compound (29) | A | Magenta | A | A |
| Example 15 | Exemplary compound (30) | A | Magenta | A | A |
| Example 16 | Exemplary compound (31) | A | Magenta | A | A |
| Example 17 | Exemplary compound (32) | A | Magenta | A | A |
| Example 18 | Exemplary compound (33) | A | Magenta | A | A |
| Example 19 | Exemplary compound (34) | A | Magenta | A | A |
| Example 20 | Exemplary compound (24) | A | Magenta | A | A |
| Example 21 | Exemplary compound (19) (concentration: 5% by mass) | A | Magenta | A | A |
| Example 22 | Exemplary compound (55) | A | Red | B | B |
| Example 23 | Exemplary compound (56) | A | Red | B | B |
| Comparative Example 1 | Comparative compound (a) | C | Purple | C | — |
| Comparative Example 2 | Comparative compound (b) | C | Purple | C | — |
| Comparative Example 3 | Comparative compound (c) | C | Red | C | — |
| Comparative Example 4 | AR52 | A | Magenta | C | C |
| Comparative Example 5 | AR289 | A | Magenta | C | B |
| Comparative Example 6 | AR26 | A | Red | C | C |
| Comparative Example 7 | Comparative compound (d) | C | Orange | C | — |

In Table 1, AR52, AR289, and AR26 represent Acid Red 52, Acid Red 289, and Acid Red 26, respectively.

In Table 1, Comparative compounds (a) to (d), AR52, AR289, and AR26 represent the following compounds.

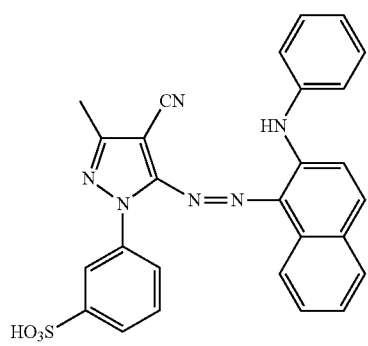
(a)

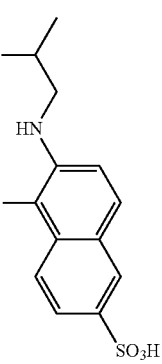
(b)

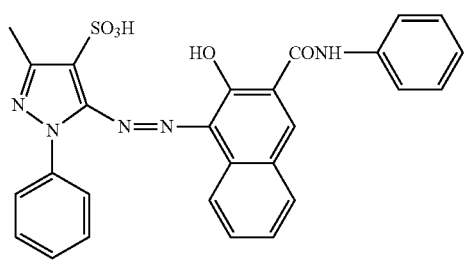
(c)

-continued

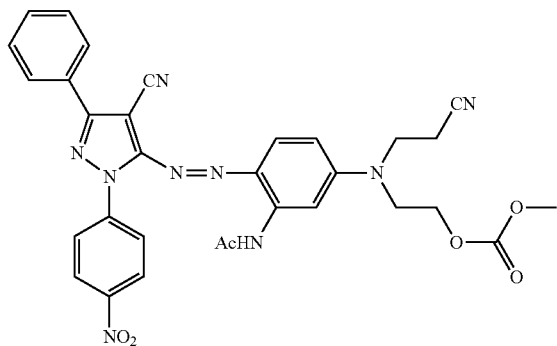

(d) AR52

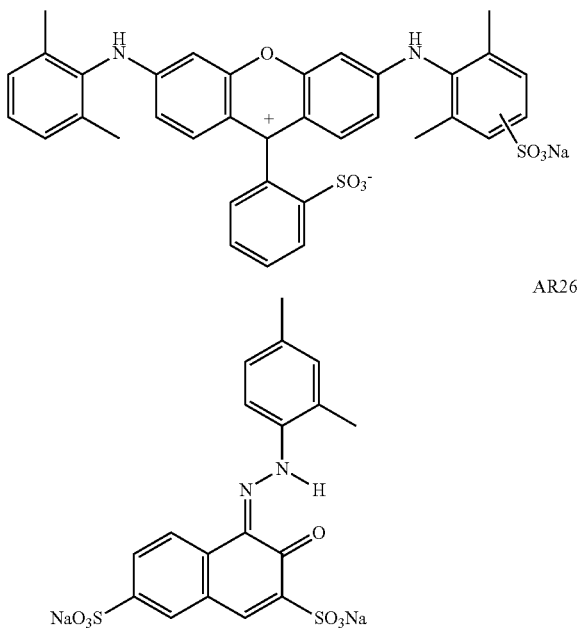

AR289

AR26

As shown in Table 1, in Examples 1 to 23 using an ink containing the dye represented by Formula (I) and water, jetting stability of the ink was excellent, bleeding of an image was suppressed, and perspiration resistance of an image was excellent. In addition, in Examples 1 to 23, by inkjet textile printing, it was possible to form a magenta, a purplish magenta, or a red image on a fabric. As described above, in Examples 1 to 23, a dyed fabric of which the back side is white and the hue of the surface is favorable was obtained while suppressing bleeding of the image.

Here, in Comparative Examples 1 to 3 and 7, jetting stability of the ink was poor, and it was not possible to perform an image formation by an inkjet method.

In addition, in Comparative Examples 1 to 7, perspiration resistance of an image was low. In particular, in Comparative Examples 4 and 6, bleeding of an image was also deteriorated.

As described above, in Examples 1 to 23 and Comparative Examples 1 to 7, the evaluation of bleeding and perspiration resistance was performed using a fabric made of silk.

Next, when the same evaluation as in Examples 1 to 23 and Comparative Examples 1 to 7 was performed, except that the fabric made of silk in Examples 1 to 23 and Comparative Examples 1 to 7 was replaced by each fabric of a fabric made of 6-nylon, a fabric made of 6,6-nylon, and a fabric made of wool, the same results as in Examples 1 to 23 and Comparative Examples 1 to 7 were obtained.

Here, in the evaluation using the fabric made of 6-nylon and in the evaluation using the fabric made of 6,6-nylon, heating time in steam in the production of the printed sample was 30 minutes.

<Evaluation of Hue>

The evaluation of hue was performed on Examples 5 and 7 to 16 in the following manner.

A L*a*b* value of an image formed on the printed sample was measured using a spectrophotometer (trade name: 938 SPECTROSCOPIC DENSITOMETER, manufactured by X-Rite Inc.) and a hue angle H(°) was calculated on the basis of this value.

A definitional equation of the hue angle H(°) is shown below.

—Definitional Equation of Hue Angle H(°)—

In $a^* \geq 0$ and $b^* \geq 0$ (first quadrant), $H(°)=\tan^{-1}(b^*/a^*)$
In $a^* \leq 0$ and $b^* \geq 0$ (second quadrant), $H(°)=180°+\tan^{-1}(b^*/a^*)$
In $a^* \leq 0$ and $b^* \leq 0$ (third quadrant), $H(°)=180°+\tan^{-1}(b^*/a^*)$
In $a^* \geq 0$ and $b^* \leq 0$ (fourth quadrant), $H(°)=360°+\tan^{-1}(b^*/a^*)$ In a case in which the hue angle H is in a range of from 340° to 360°, a favorable magenta hue is shown.

In a case in which the hue angle H is less than 340°, the color become bluish, and in a case in which the hue angle H is greater than 360°, the color become reddish, and thus, from the viewpoint of a favorable magenta hue. Therefore, the above range is preferable.

Moreover, it is preferable that an ink (image) show a favorable magenta hue from the viewpoint of color reproduction gamut expansion of an image. In addition, it is also preferable that an ink (image) show a favorable magenta hue from the viewpoint that demand for a magenta hue as the hue of an image is high in the field of textile printing.

The hue angles H's of the images on the printed samples in Examples 5 and 7 to 16 are shown in the following Table 2.

TABLE 2

| | Hue angle (°) |
|---|---|
| Example 5 | 360 |
| Example 7 | 349 |
| Example 8 | 344 |
| Example 9 | 358 |
| Example 10 | 360 |
| Example 11 | 359 |
| Example 12 | 358 |
| Example 13 | 357 |
| Example 14 | 355 |
| Example 15 | 354 |
| Example 16 | 357 |

As shown in Table 2, all of the hue angles H°'s of the images on the printed samples in Examples 5 and 7 to 16 were from 340° to 360°.

That is, in Examples 5 and 7 to 16, it was possible to form an image with a favorable magenta hue by inkjet textile printing.

The entire disclosures of Japanese Patent Application No. 2012-102817 is incorporated by reference in this specification.

All literatures, patents, patent applications, and technical standards described in this specification are incorporated by reference in this specification to the same degree as the case of specifically and respectively describing that respective literatures, patents, patent applications and technical standards are incorporated by reference.

The invention claimed is:

1. A coloring composition for inkjet textile printing, comprising:
water and a dye represented by the following Formula (I):

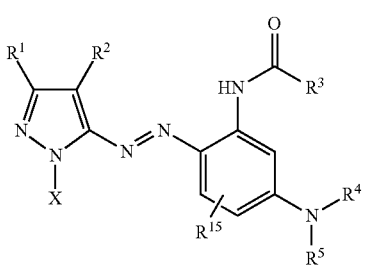

wherein, in Formula (I), $R^1$ represents a hydrogen atom, a halogen atom, an alkyl group, an aralkyl group, an aryl group, a heteroaryl group, an alkoxy group, or a cyano group;
$R^2$ represents a hydrogen atom, a halogen atom, a cyano group, a —$COOR^6$ group, a —$COR^7$ group, a —$CONR^8R^9$ group, a —$SONR^{10}R^{11}$ group, or an ionic hydrophilic group;
$R^3$ represents an alkyl group, an aralkyl group, an alkenyl group, an alkynyl group, an aryl group, or a heteroaryl group;
each of $R^4$ and $R^5$ independently represents a hydrogen atom, an alkyl group, a cycloalkyl group, an aralkyl group, an alkenyl group, an alkynyl group, an aryl group, or a heteroaryl group, and $R^4$ and $R^5$ may be bonded to each other to form a heterocycle with the nitrogen atom to which $R^4$ and $R^5$ are bonded;
$R^{15}$ represents a hydrogen atom or a substituent;
X is a group represented by the following Formula (X-1):

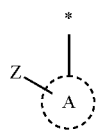

wherein, in Formula (X-1), A represents a cycloalkyl group, an aryl group, or a heteroaryl group, and "*" represents a binding site with the pyrazole ring in Formula (I);

Z represents a monovalent substituent that is bonded to at least one of two atoms in A that are respectively adjacent to an atom bonded to the pyrazole ring in Formula (I);
the monovalent substituent represented by Z is a substituent (a) selected from the group consisting of a halogen atom, an alkyl group, a cycloalkyl group, an alkenyl group, an aralkyl group, an aryl group, a heteroaryl group, a cyano group, a hydroxyl group, a nitro group, an amino group, an alkyl amino group, an alkoxy group, an aryloxy group, an aryl amino group, a sulfamoyl amino group, an alkyl thio group, an aryl thio group, an alkoxycarbonyl amino group, a carbamoyl group, a sulfamoyl group, an alkoxycarbonyl group, a heterocyclic oxy group, an acyloxy group, a carbamoyloxy group, a silyloxy group, an aryloxy carbonyl group, an aryloxy carbonyl amino group, a heterocyclic thio group, an acyl group and an ionic hydrophilic group, or a substituent (b) obtainable by bonding the substituent (a) and a linking group selected from the group consisting of an amide group, a ureido group, a sulfonamide group, a sulfonyl group, an azo group, an imide group, a sulfinyl group and a phosphoryl group; and
in a case in which two Z's are present in Formula (X-1), the two Z's may be the same as or different from each other;
$R^6$ represents an alkyl group, an aryl group, or a heteroaryl group;
each of $R^7$ to $R^{14}$ independently represents a hydrogen atom, an alkyl group, an aryl group, or a heteroaryl group; and
a total number of ionic hydrophilic groups included, as a substituent, in one molecule of the dye represented by Formula (I) is from 1 to 5 and each ionic hydrophilic group included in one molecule of the dye as a substituent is selected from the group consisting of a carboxy group, a salt of a carboxy group, a sulfo group, a salt of a sulfo group and a quaternary ammonium group.

2. The coloring composition according to claim 1, wherein X is a group represented by the following Formula (X-2):

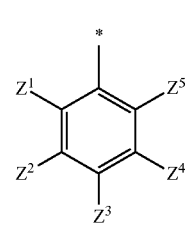

wherein, in Formula (X-2), "*" represents a binding site with the pyrazole ring in Formula (I);
each of $Z^1$, $Z^2$, $Z^3$, $Z^4$ and $Z^5$ independently represents a hydrogen atom, a halogen atom, a cyano group, a nitro group, an amino group, an alkyl amino group, an aryl amino group, an ionic hydrophilic group, an alkyl carbonyl amino group, an aryl carbonyl amino group, an alkyl sulfonyl amino group, an aryl sulfonyl amino group, or an aryl carbonyl amino group substituted with an ionic hydrophilic group, but $Z^1$ and $Z^5$ do not simultaneously represent a hydrogen atom.

3. The coloring composition according to claim 1, wherein:
$R^1$ represents a hydrogen atom, a halogen atom, an alkyl group, or a cyano group, $R^2$ represents a hydrogen atom, a halogen atom, a cyano group, a —COOR$^6$ group, a —CONR$^8$R$^9$ group, or an ionic hydrophilic group, $R^3$ represents an alkyl group, an aryl group, or an aryl group substituted with an ionic hydrophilic group, each of $R^4$ and $R^5$ independently represents a hydrogen atom, an alkyl group, an aralkyl group, an aryl group, a heteroaryl group, an alkyl group substituted with an ionic hydrophilic group, an aralkyl group substituted with an ionic hydrophilic group, an aryl group substituted with an ionic hydrophilic group, or a heteroaryl group substituted with an ionic hydrophilic group, but $R^4$ and $R^5$ do not simultaneously represent a hydrogen atom, and $R^{15}$ represents a hydrogen atom, a halogen atom, an alkyl group, or an alkoxy group.

4. The coloring composition according to claim 2, wherein each of $Z^1$, $Z^2$, $Z^3$, $Z^4$, and $Z^5$ independently represents a hydrogen atom, a halogen atom, a cyano group, an aryl carbonyl amino group, or an aryl carbonyl amino group substituted with an ionic hydrophilic group selected from the group consisting of a carboxy group, a salt of a carboxy group, a sulfo group and a salt of a sulfo group.

5. The coloring composition according to claim 4, wherein:
$R^1$ represents a hydrogen atom, a halogen atom, an alkyl group, or a cyano group;
$R^2$ represents a hydrogen atom, a halogen atom, a cyano group, a —COOR$^6$ group, a —CONR$^8$R$^9$ group, or an ionic hydrophilic group;
$R^3$ represents an alkyl group, an aryl group, or an aryl group substituted with an ionic hydrophilic group;
each of $R^4$ and $R^5$ independently represents a hydrogen atom, an alkyl group, an aralkyl group, an aryl group, a heteroaryl group, an alkyl group substituted with an ionic hydrophilic group, an aralkyl group substituted with an ionic hydrophilic group, an aryl group substituted with an ionic hydrophilic group, or a heteroaryl group substituted with an ionic hydrophilic group, but $R^4$ and $R^5$ do not simultaneously represent a hydrogen atom; and
$R^{15}$ represents a hydrogen atom, a halogen atom, an alkyl group, or an alkoxy group.

6. The coloring composition according to claim 4, wherein each ionic hydrophilic group included in one molecule of the dye as a substituent is selected from the group consisting of a carboxy group, a salt of a carboxy group, a sulfo group, a salt of a sulfo group and a quaternary ammonium group.

7. The coloring composition according to claim 1, wherein:
$R^1$ represents an alkyl group;
$R^2$ represents a halogen atom or a cyano group;
$R^3$ represents an alkyl group or an aryl group;
each of $R^4$ and $R^5$ independently represents an alkyl group or an alkyl group substituted with an ionic hydrophilic group selected from the group consisting of a carboxy group, a salt of a carboxy group, a sulfo group and a salt of a sulfo group; and
$R^{15}$ represents a hydrogen atom.

8. A textile printing method, comprising applying the coloring composition according to claim 1 onto a fabric comprising a polyamide fiber by an inkjet method.

9. A fabric having an image formed thereon by the textile printing method according to claim 8.

* * * * *